(12) United States Patent
Umetsu et al.

(10) Patent No.: US 11,480,513 B2
(45) Date of Patent: Oct. 25, 2022

(54) FINE PARTICLE MEASUREMENT APPARATUS, INFORMATION PROCESSING APPARATUS, AND INFORMATION PROCESSING METHOD

(71) Applicant: Sony Corporation, Tokyo (JP)

(72) Inventors: Tomoyuki Umetsu, Tokyo (JP); Masaaki Hara, Tokyo (JP); Nobuhiro Hayashi, Kanagawa (JP); Yasunobu Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 16/643,270

(22) PCT Filed: May 31, 2018

(86) PCT No.: PCT/JP2018/020966
§ 371 (c)(1),
(2) Date: Feb. 28, 2020

(87) PCT Pub. No.: WO2019/049442
PCT Pub. Date: Mar. 14, 2019

(65) Prior Publication Data
US 2020/0182772 A1    Jun. 11, 2020

(30) Foreign Application Priority Data
Sep. 8, 2017   (JP) .............................. JP2017-172904

(51) Int. Cl.
*G01N 15/14*   (2006.01)
*G01N 15/10*   (2006.01)

(52) U.S. Cl.
CPC ..... *G01N 15/1429* (2013.01); *G01N 15/1434* (2013.01); *G01N 15/1012* (2013.01); *G01N 15/1459* (2013.01); *G01N 2015/1006* (2013.01)

(58) Field of Classification Search
CPC ........... G01N 15/1012; G01N 15/1429; G01N 15/1434; G01N 15/1459; G01N 2015/1006
See application file for complete search history.

(56) References Cited

U.S. PATENT DOCUMENTS 5,072,382 A    12/1991   Kamentsky
6,016,194 A *   1/2000   Girvin ................ G01N 15/1459
                                                            356/336

(Continued)

FOREIGN PATENT DOCUMENTS

EP   0 421 736 A2   4/1991
JP   3-255365 A    11/1991

(Continued)

OTHER PUBLICATIONS

International Written Opinion and translation thereof dated Aug. 28, 2018 in connection with International Application No. PCT/JP2018/020966.

(Continued)

*Primary Examiner* — Mark R Gaworecki
(74) *Attorney, Agent, or Firm* — Wolf, Greenfield & Sacks, P.C.

(57)   ABSTRACT

The fine particle measurement apparatus according to the present technology includes a detection section, a multiplication factor setting section, a correction factor calculation section, and a spectrum generation section. The detection section has a plurality of detectors for detecting light from fine particles. The multiplication factor setting section sets a multiplication factor for each of the plurality of detectors. The correction factor calculation section calculates a correction factor on the basis of the set multiplication factor.

(Continued)

The spectrum generation section generates spectral data by correcting a value detected by the detector, with the calculated correction factor.

14 Claims, 12 Drawing Sheets

(56) References Cited

U.S. PATENT DOCUMENTS

| | | |
|---|---|---|
| 2004/0119974 A1 | 6/2004 | Bishop et al. |
| 2006/0038996 A1 | 2/2006 | Kuroiwa et al. |
| 2010/0120059 A1 | 5/2010 | Yan et al. |
| 2012/0010822 A1 | 1/2012 | Kato et al. |
| 2012/0056103 A1 | 3/2012 | Sakai |
| 2013/0026391 A1 | 1/2013 | Sekino et al. |
| 2013/0065269 A1 | 3/2013 | Nitta |
| 2013/0323825 A1 | 12/2013 | Sekino et al. |
| 2018/0174335 A1 | 6/2018 | Yamakawa et al. |
| 2019/0011348 A1 | 1/2019 | Tahara |

FOREIGN PATENT DOCUMENTS

| | | |
|---|---|---|
| JP | H03-255365 A | 11/1991 |
| JP | 2003-214951 A | 7/2003 |
| JP | 2004-205508 A | 7/2004 |
| JP | 2006-058237 A | 3/2006 |
| JP | 2010-156679 A | 7/2010 |
| JP | 2011232259 A | 11/2011 |
| JP | 2012-018108 A | 1/2012 |
| JP | 2012021863 A | 2/2012 |
| JP | 2012-052985 A | 3/2012 |
| JP | 2012047462 A | 3/2012 |
| JP | 2013-024792 A | 2/2013 |
| JP | 2013-061244 A | 4/2013 |
| JP | 2013-246140 A | 12/2013 |
| JP | 2014-010314 A | 1/2014 |
| WO | WO-2007097170 A1 | 8/2007 |
| WO | WO-2007097171 A1 | 8/2007 |
| WO | WO 2016/199716 A1 | 12/2016 |
| WO | WO 2017/018057 A1 | 2/2017 |
| WO | WO 2017/126170 A1 | 7/2017 |

OTHER PUBLICATIONS

International Preliminary Report on Patentability and translation thereof dated Mar. 19, 2020 in connection with International Application No. PCT/JP2018/020966.

International Search Report and translation thereof dated Aug. 28, 2018 in connection with International Application No. PCT/JP2018/020966.

Extended European Search Report dated Oct. 14, 2020 in connection with European Application No. 18853768.2.

Koji Futamura et al., Novel Full-Spectral Flow Cytometry with Multiple Spectrally-Adjacent Fluorescent Proteins and Fluorochromes and Visualization of In Vivo Cellular Movement, Cytometry Part A, Jul. 28, 2015, 87A, 830-842.

Nao Nitta et al., Method and Theory of the Autofluorescence Unmixing in SP6800 Spectral Cell Analyzer, Sony Biotechnology Inc. Technical Bulletin, Jun. 4, 2015, pp. 1-3, <URLhttps://www.sony.co.jp/Products/LifeScience/common/docs/app/sp6800z/07.pdf>.

* cited by examiner

FINE PARTICLE MEASUREMENT APPARATUS, INFORMATION PROCESSING APPARATUS, AND INFORMATION PROCESSING METHOD

CROSS-REFERENCE TO RELATED APPLICATIONS

This application claims the benefit under 35 U.S.C. § 371 as a U.S. National Stage Entry of International Application No. PCT/JP2018/020966, filed in the Japanese Patent Office as a Receiving Office on May 31, 2018, which claims priority to Japanese Patent Application Number JP2017-172904, filed in the Japanese Patent Office on Sep. 8, 2017, each of which is hereby incorporated by reference in its entirety.

TECHNICAL FIELD

The present technology relates to a fine particle measurement apparatus, an information processing apparatus, and an information processing method, and relates particularly to a technology of a fine particle measurement apparatus for optically measuring characteristics of fine particles such as cells.

BACKGROUND ART

In general, in the case where proteins of biological fine particles such as cells, microorganisms, and liposomes are analyzed, flow cytometry (flow cytometer) has found wide application. Flow cytometry is a technique for analyzing a plurality of fine particles, one by one, by applying a laser beam (excitation light) at a specific wavelength to the fine particles flowing in a single file through a channel and detecting fluorescence or scattered light. In this flow cytometry, light detected by a photodetector is converted into an electric signal, quantified, and statistically analyzed, thus making it possible to determine a type, a size, a structure, and other characteristics of each fine particle.

In order to push forward comprehensive interpretation in basic medicine and clinical discipline, multicolor analysis using a plurality of fluorescent dyes is becoming widespread in flow cytometry, as well. However, use of a plurality of fluorescent dyes on a single measurement occasion as in multicolor analysis causes light from fluorescent dyes other than the intended one to leak into each photodetector, thus deteriorating analysis accuracy. For this reason, an existing flow cytometer performs fluorescence correction to extract only intended light information from the intended fluorescent dye. However, in the case where the spectra of fluorescent dyes are adjacent, a significant amount of light leaks into the detector, thus leading to an event that cannot be remedied by fluorescence correction.

Here, fluorescence detection by flow cytometer includes not only a technique that selects a plurality of light beams in discontinuous bands of wavelengths by using a wavelength selection device such as a filter and measures light beam intensities in each band of wavelengths but also a technique that measures light intensities in continuous bands of wavelengths as fluorescence spectra. For example, PTL 1 discloses, as a spectrum-type flow cytometer capable of fluorescent spectral measurement, a technique that conducts spectroscopy on fluorescence emitted from a fine particle by using a spectroscopic device such as prism or grating. A spectrum-type flow cytometer is a system that analyzes an amount of fluorescence of each fine particle by deconvoluting fluorescence data, measured from a fine particle, with spectral information of a fluorescent dye used for staining.

As an example, the spectrum-type flow cytometer of PTL 1 detects fluorescence produced by spectroscopy, by using a light-receiving device array that includes a plurality of light-receiving devices having different bands of detection wavelengths. Also, a PMT array or a photodiode array that includes one-dimensional arrangement of light-receiving devices such as PMTs or photodiodes, or a CCD, a CMOS, or other device that includes arrangement of a plurality of independent detection channels such as two-dimensional light-receiving devices, is employed as a light-receiving device array.

CITATION LIST

Patent Literature

[PTL 1]
JP 2013-61244A

SUMMARY

Technical Problem

However, the technique proposed by PTL 1 may fall short of further improving spectral separation capability.

Therefore, the present technology has been devised in light of such circumstances, and it is a main object of the present technology to provide a fine particle measurement apparatus that offers improved spectral separation capability with reduced noise.

Solution to Problem

The present technology provides a spectrum-type fine particle measurement apparatus that includes a detection section, a multiplication factor setting section, a correction factor calculation section, and a spectrum generation section. The detection section has a plurality of detectors for detecting light from fine particles. The multiplication factor setting section sets a multiplication factor for each of the plurality of detectors. The correction factor calculation section calculates a correction factor on the basis of the set multiplication factor. The spectrum generation section generates spectral data by correcting a value detected by the detector, with the calculated correction factor.

Also, the present technology provides an information processing apparatus that includes a multiplication factor setting section, a correction factor calculation section, and a spectrum generation section. The multiplication factor setting section sets a multiplication factor for each of a plurality of detectors, the detectors detecting light from fine particles. The correction factor calculation section calculates a correction factor on the basis of the set multiplication factor. The spectrum generation section generates spectral data by correcting a value detected by the detector, with the calculated correction factor. Further, the present technology provides an information processing method that includes: by a processor, a step of setting a multiplication factor for each of a plurality of detectors, the detectors detecting light from fine particles; a step of calculating a correction factor on the basis of the set multiplication factor; and a step of generating spectral data by correcting a value detected by the detector, with the calculated correction factor.

Advantageous Effect of Invention

The present technology provides a fine particle measurement apparatus that offers improved spectral separation capability with reduced noise. It should be noted that the effect described herein is not necessarily limited and may differ from any one of the effects described in the present disclosure or from these effects.

DESCRIPTION OF EMBODIMENTS

Figure 1:
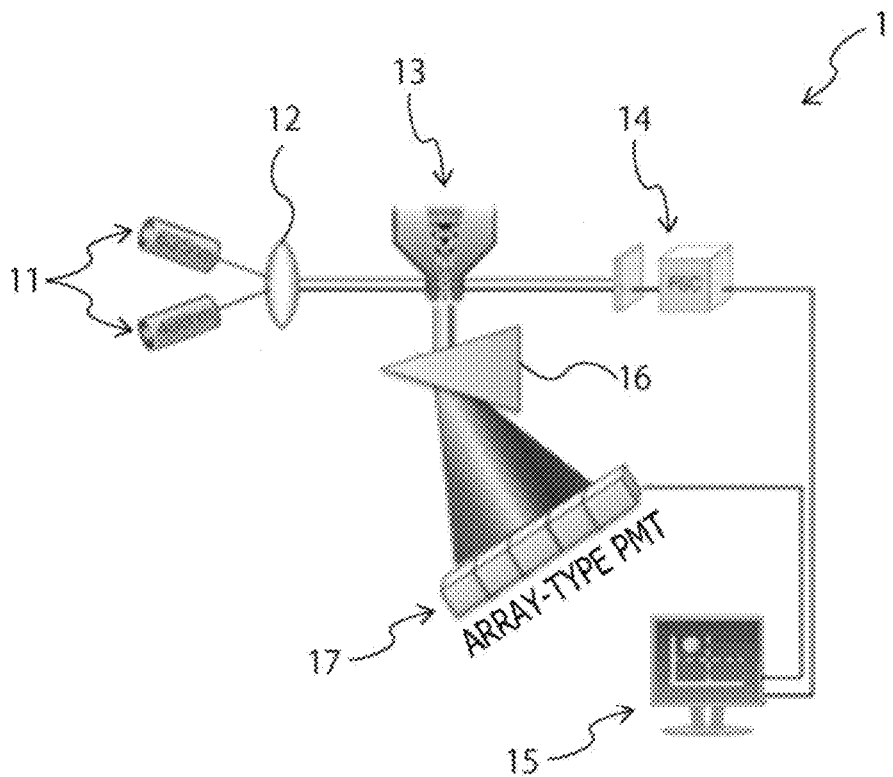
FIG. 1 is a schematic diagram illustrating a configuration example of a fine particle measurement apparatus according to the present technology.

A description will be given below of preferred modes for carrying out the present technology with reference to drawings. Each of the embodiments described below can be combined with any other embodiment. Examples of typical embodiments of the present technology are depicted, and the scope of the present technology is not to be interpreted narrowly because of them. Also, each of the embodiments described below can be combined with any one of or a plurality of embodiments. It should be noted that, in the drawings, the same or equivalent elements or members will be denoted by the same reference signs and that redundant description will be omitted.

The description will be given in the following order:
1. Overview of fine particle measurement apparatus
2. First embodiment (configuration example of fine particle measurement apparatus)
(2-1) Configuration example of fine particle measurement apparatus
(2-2) Configuration example of data analysis section
(2-3) Processing operation example of fine particle measurement apparatus
(2-4) Working examples
3. Hardware configuration example 1. Overview of Fine Particle Measurement Apparatus A description will be given below of an overview of a fine particle measurement apparatus according to the present technology by using FIG. 1. In the present embodiment, a spectrum-type flow cytometer will be described as an example of a fine particle measurement apparatus.

FIG. 1 is a schematic diagram illustrating a configuration example of the fine particle measurement apparatus according to the present technology. As illustrated in FIG. 1, a spectrum-type flow cytometer 1, a fine particle measurement apparatus, includes, as an example, laser beam sources 11, a lens 12, an optofluidic system 13, a filter detector 14, and a user interface 15. Also, the spectrum-type flow cytometer 1 includes a prism 16 and an array-type high-sensitivity detector (PMT) 17 to detect spectra. It should be noted that although the PMT 17 is used to detect light in the present embodiment, the detector is not limited thereto, and an APD or other device may also be used.

The spectrum-type flow cytometer 1 is a fine particle measurement apparatus that optically measures characteristics of each fine particle by applying light from the laser beam source 11 to fine particles such as cells and beads flowing through a flow cell and detecting fluorescence, scattered light, or other light emitted from the fine particles. Also, the optofluidic system 13 is a system that analyzes and sorts fine particles by detecting optical information acquired from the fine particles aligned in a single file in the flow cell (channel).

For example, in the case where cell fluorescence is detected, excitation light of an appropriate wavelength and strength such as laser beam is irradiated onto cells labeled with a fluorescent dye. Then, fluorescence emitted from the fluorescent dye is converged by the lens 12 or other optics, followed by selection of light in an appropriate wavelength band using a wavelength selection device such as filter of the filter detector 14 or dichroic mirror and detection of the selected light with a light-receiving device such as the PMT (photo multiplier tube) 17. At this time, it is possible to simultaneously detect and analyze fluorescence from a plurality of fluorescent dyes with which the cells are labeled by combining a plurality of wavelength selection devices and light-receiving devices. Further, it is possible to increase the number of analyzable fluorescent dyes by combining excitation light of a plurality of wavelengths.

In general, fluorescence detection in flow cytometers includes not only a technique that selects a plurality of light beams in discontinuous bands of wavelengths by using a wavelength selection device such as a filter and measures light beam intensities in each band of wavelengths but also a technique that measures light intensities in continuous bands of wavelengths as fluorescence spectra. Capable of measuring fluorescence spectra, the spectrum-type flow cytometer 1 conducts spectroscopy on fluorescence emitted from fine particles by using a spectroscopic device such as the prism 16 or grating. Then, the fluorescence that has undergone spectroscopy is detected using the light-receiving device array 17 that has a plurality of light-receiving devices of different wavelength bands arranged therein. A PMT array having one-dimensional arrangement of PMT light-receiving devices is used as the light-receiving device array 17. It should be noted that a photodiode array that includes one-dimensional arrangement of light-receiving devices such as photodiodes, or a CCD, a CMOS, or other device that includes arrangement of a plurality of independent detection channels such as two-dimensional light-receiving devices, is also employed as a light-receiving device array.

In fine particle analysis typified by flow cytometry, an optical technique is common that applies light such as laser beam to fine particles of interest and detects fluorescence or scattered light emitted from the fine particles. As an example, a histogram is extracted and analyzed by using an analyzing computer and software on the basis of optical information detected using the spectrum-type flow cytometer 1.

In optical analysis of fine particles, there are cases in which quality control (QC) may be performed to verify the accuracy and other features, confirm and standardize the operation of the apparatus, and perform other tasks prior to actual optical measurement of fine particles of interest. In quality control, a plurality of beads (e.g., 3 peak beads, 6 peak beads, or 8 peak beads) labeled with fluorescent dyes having different fluorescence intensities, beads of one kind (e.g., align check beads or Ultra Rainbow Fluorescent Particles) that provide a wide range of spectra, or other beads are usually used.

An ordinary spectrum-type flow cytometer includes an array-type high-sensitivity detector for detecting spectra in place of a number of high-sensitivity detectors included in an existing flow cytometer. Because of its lack of high-sensitivity detectors, one for each fluorescent dye, available in the existing type, the ordinary spectrum-type flow cytometer presents difficulty in setting a target detection sensitivity value. Moreover, the array-type high-sensitivity detector has a number of PMTs, making it extremely difficult for a user to set an appropriate multiplication factor for each PMT one by one. Also, when the amount of fluorescence is calculated by a deconvolution process using spectral information, there are a number of parameters to be considered that may affect the deconvolution results. Most of the apparatuses realized as of now are configured to permit easy manipulation by limiting the degree of freedom of parameters to an extent controllable by ordinary users. For this reason, a situation has arisen in which spectrum-type flow cytometers cannot deliver their maximum fluorescent dye separation capability that is inherently available. It is an object of the present technology to solve such a problem.

2. First Embodiment (Configuration Example of Fine Particle Measurement Apparatus)

(2-1) Configuration Example of Fine Particle Measurement Apparatus

Figure 2:
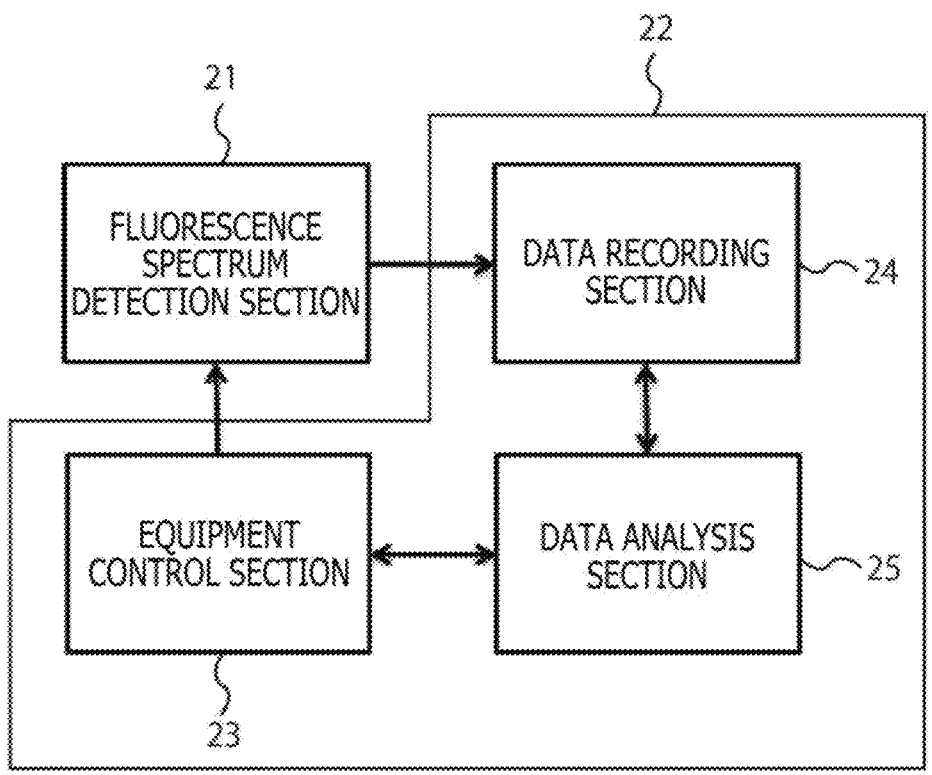
FIG. 2 is a block diagram illustrating a configuration example of a fine particle measurement apparatus of a first embodiment according to the present technology.

FIG. 2 is a block diagram illustrating a configuration example of the fine particle measurement apparatus of the first embodiment according to the present technology. A description will be given of a configuration example of the fine particle measurement apparatus of the present embodiment using FIGS. 1 and 2.

As illustrated in FIG. 2, the spectrum-type flow cytometer 1, a fine particle measurement apparatus, includes a fluorescence spectrum detection section 21 and an information processing apparatus 22. In the spectrum-type flow cytometer 1, the laser beam sources 11, the lens 12, the optofluidic system 13, and the filter detector 14 illustrated in FIG. 1 play a role of the fluorescence spectrum detection section 21, and the user interface 15 plays a role of the information processing apparatus 22. The information processing apparatus 22 includes an equipment control section 23, a data recording section 24, and a data analysis section 25.

The fluorescence spectrum detection section 21 is a section that detects the amounts of fluorescence of a number of fine particles. When optically analyzing fine particles, the fluorescence spectrum detection section 21 emits excitation light from the light sources of the laser beam source 11 first and applies the excitation light to fine particles flowing through the channel of the optofluidic system 13. Next, the filter detector 14 detects fluorescence emitted from the fine particle. Specifically, only light of specific wavelengths (intended fluorescence) is separated from light emitted from the fine particles using a dichroic mirror or a band pass filter, and separated light is detected, for example, with detectors such as the 32-channel PMT 17. At this time, fluorescence is undergone spectroscopy, for example, by using the prism 16 or diffraction grating to detect light of different wavelengths at each channel of the detector. This allows for easy acquisition of spectral information of detected light (fluorescence). Fine particles to be analyzed are not particularly limited, and among examples of such fine particles are cells and microbeads.

The equipment control section 23 is a section that sets conditions for measuring fine particles and controls the operation of equipment. More specifically, the equipment control section 23 is a section that changes, for optimization, parameters such as delivery conditions of a sample including fine particles, output of the laser beam sources 11 related to fluorescence detection, fluorescence detector sensitivity control, and optical stage position adjustment. A specific working procedure of the equipment control section 23 is that the user delivers an actual sample to set optimal conditions that provide desired results for the target sample and repeatedly adjusts various parameters as needed while checking the detected fluorescence signals. In order to ensure ease in making setting changes, the equipment control section 23 is configured to allow the user to make changes to the parameters primarily from control software on a computer.

The data recording section 24 is a section that records spectral data of each of the fine particles detected by the fluorescence spectrum detection section 21. The data recording section 24 has a function to record spectral information of each of the fine particles acquired by the fluorescence spectrum detection section 21 together with scattered light, time, and position information other than spectral information. The recording function of the data recording section 24 is primarily that using a computer's memory and disk. In ordinary cell analysis, several thousand to several million fine particles are analyzed under a single experimental condition. Therefore, the data recording section 24 needs to record a number of pieces of spectral information in a manner organized for each experimental condition.

The data analysis section 25 is a section that performs a variety of data processing tasks in such a manner as to provide desired analysis results from the data recorded in the data recording section 24. The data analysis section 25 quantizes the optical intensities in each wavelength band detected by the fluorescence spectrum detection section 21 and finds the amount of fluorescence (optical intensity) for each fluorescent dye used, for analysis, by using a computer or other equipment. This analysis employs linear fitting based on the least squares method using a reference spectrum calculated from experimental data or other technique.

The reference spectrum is calculated through a statistical process by using two types of data, i.e., measurement data of fine particles stained with only one fluorescent dye and measurement data of unstained fine particles. It is necessary to estimate a plausible reference spectrum shape of the fluorescent dye used for staining and a reference spectrum shape of autofluorescence of unstained fine particles from actual data measured with the spectrum cytometer, by performing this statistical process properly.

Also, the calculated reference spectrum is recorded in the data recording section 24 together with a fluorescent molecule name, a measurement date, a fine particle type, and other information. The amount of sample fluorescence (fluorescence spectral data) estimated by the data analysis section 25 is stored in the data recording section 24, displayed in a graph form according to the purpose, and analyzed in terms of the amounts of fluorescence of fine particles. The chief part of the present technology is an algorithm that calculates setup parameters used by the equipment control section 23 from data measured by the data analysis section 25 and reflects the setup parameters up to a fluorescence separation process calculation.

(2-2) Configuration Example of Data Analysis Section

Figure 3:
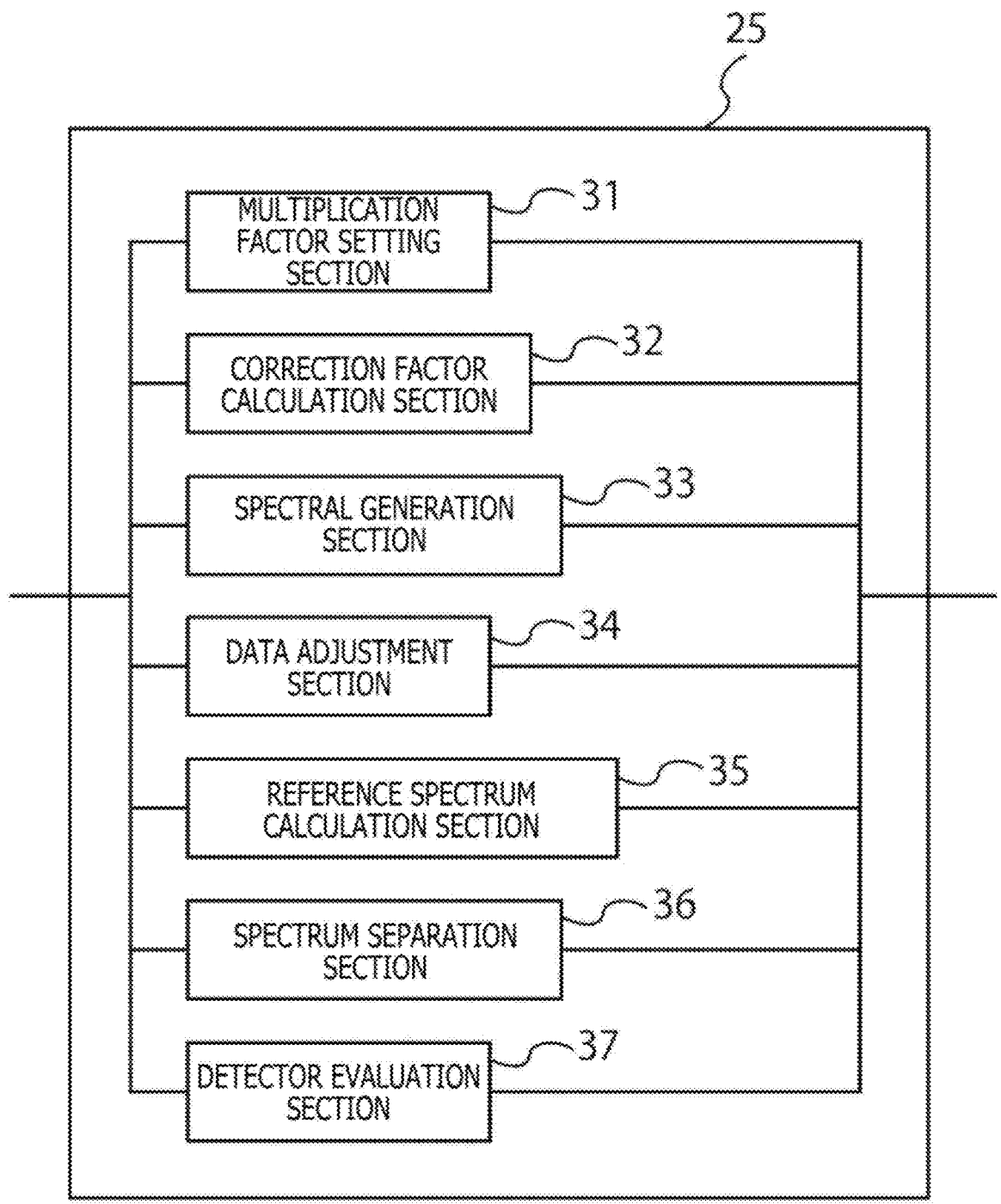
FIG. 3 is a block diagram illustrating a configuration example of a data analysis section of the first embodiment according to the present technology.

A description will be given next of a configuration example of the data analysis section 25 of the present embodiment. FIG. 3 is a block diagram illustrating a configuration example of the data analysis section 25 of the present embodiment. The data analysis section 25 includes a multiplication factor setting section 31, a correction factor calculation section 32, a spectrum generation section 33, a data adjustment section 34, a reference spectrum calculation section 35, a spectrum separation section 36, and a detector evaluation section 37.

The multiplication factor setting section 31 sets a multiplication factor for each of the PMTs 17 of the fluorescence spectrum detection section 21, i.e., the plurality of detectors for detecting light from fine particles. The multiplication factor setting section 31 can set a multiplication factor on the basis of a voltage applied by the detector. Also, the multiplication factor setting section 31 can automatically set a multiplication factor from a single piece of measurement data of a sample including a mixture of single-stained samples stained with a single fluorescent dye or a multi-stained sample stained with all fluorescent dyes.

The correction factor calculation section 32 calculates a correction factor on the basis of the multiplication factor set by the multiplication factor setting section 31. The correction factor calculation section 32 can automatically calculate a correction factor from a single piece of measurement data of a sample including a mixture of single-stained samples stained with a single fluorescent dye or a single piece of measurement data of a multi-stained sample stained with all fluorescent dyes. Also, the correction factor can be calculated from the applied voltage set individually for each PMT 17. This correction factor is a value based, for example, on uniformity of the detector, a wavelength band width detected for each of the plurality of detectors, or wavelength dependence of photoelectric conversion. Also, the correction factor may be calculated from actual data by measuring a condition setting sample after adjustment of individual gains.

The spectrum generation section 33 generates spectral data by correcting the values detected by the PMT 17, the detector, with the correction factor calculated by the correction factor calculation section 32.

The data adjustment section 34 automatically adjusts the maximum value detected by the fluorescence spectrum detection section 21 to a predetermined threshold on the basis of the multiplication factor set by the multiplication factor setting section 31. By finding a relational formula between the multiplication factor and the applied voltage, the data adjustment section 34 automatically calculates, for each of the PMTs 17 in advance, by what number the applied voltage needs to be multiplied for the maximum value to reach the threshold, for adjustment. It should be noted that the detection upper limit value of the PMT 17, the detector, can be used as a predetermined threshold.

The reference spectrum calculation section 35 calculates a reference spectrum on the basis of the spectral data generated by the spectrum generation section 33. The calculated reference spectral data may be either spectral data obtained in advance by measuring fine particles including a known fluorescent substance with the spectrum-type flow cytometer 1 and making correction using the above correction factor or spectral data obtained by measuring fluorescence spectrum of that fluorescent substance with an ordinary fluorescence spectrophotometer.

The spectrum separation section 36 separates spectra by using the reference spectrum calculated by the reference spectrum calculation section 35. The spectrum separation section 36 can perform the spectral separation process by using the weighted least squares method which will be described later, on the basis of the calculated correction factor.

The detector evaluation section 37 evaluates each PMT 17, the detector, by using measurement data of a plurality of mixed fine particles having different fluorescence intensities and different grain diameters. The detector evaluation section 37 can find a relational formula between the multiplication factor and the applied voltage by using an evaluation jig or other tool during inspection at the time of manufacture of the spectrum-type flow cytometer 1. This makes it possible to update the relational formula between the multiplication factor and the applied voltage through simple measurement even in the case where the spectrum-type flow cytometer 1 changes over time.

(2-3) Processing Operation Example of Fine Particle Measurement Apparatus

Figure 4:
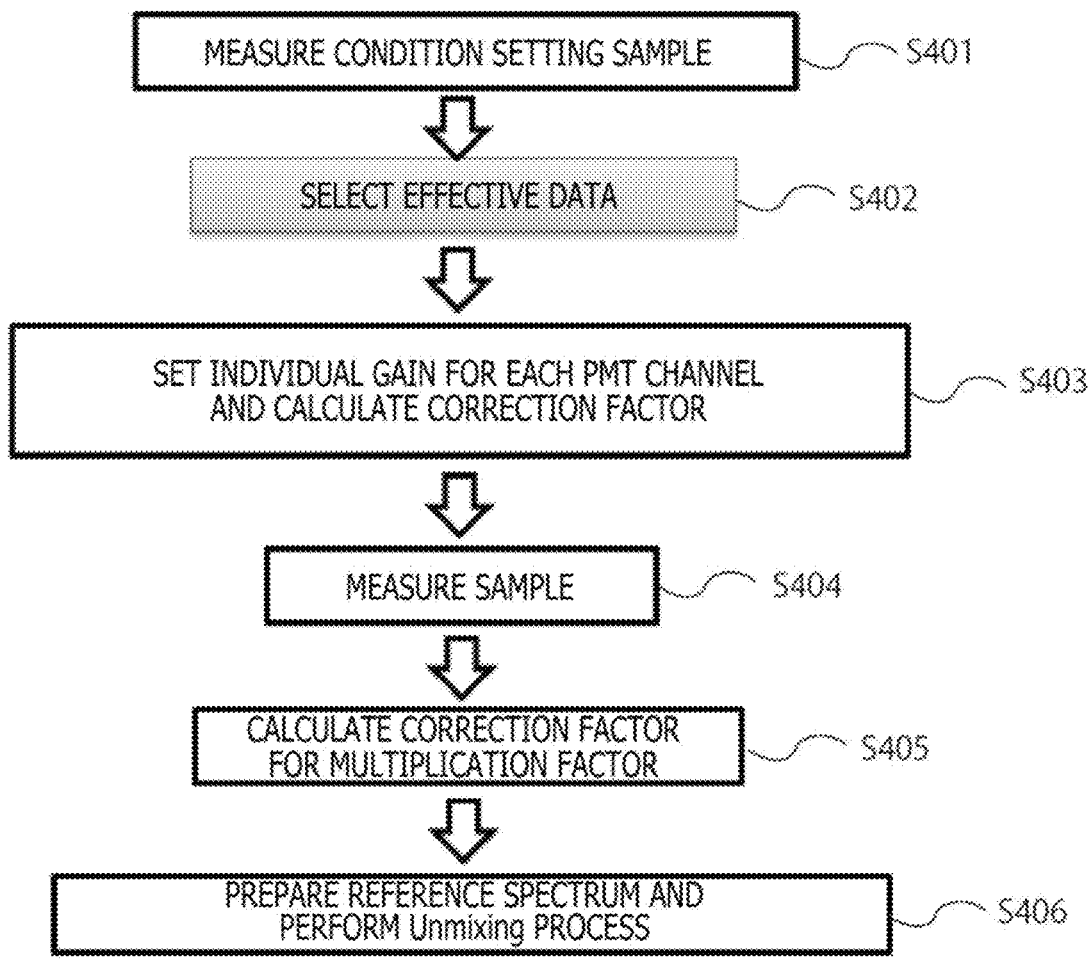
FIG. 4 is a flowchart illustrating an example of a processing operation of the fine particle measurement apparatus of the first embodiment according to the present technology.

FIG. 4 is a flowchart illustrating an example of processing operation of the fine particle measurement apparatus of the present embodiment. A description will be given of the processing operation of the spectrum-type flow cytometer 1, the fine particle measurement apparatus of the present embodiment, by using FIG. 4. A detailed operation example in each step will be described later, and the flow of the measurement algorithm as a whole will be described first.

In step S401, fine particles, a condition setting sample, are prepared first, and conditions for measuring the fine particles, the sample, are set on the equipment control section 23. When the measurement condition setting is finished, the fluorescence spectrum detection section 21 measures the fine particles, the sample, under certain set conditions. At this time, the data adjustment section 34 automatically adjusts an overall PMT value such that the fluorescence values of all fine particles become a predetermined value, that is, fall within limits of the PMT 17. A description will be given here of the manner in which the overall PMT value is adjusted. First, in the case where the upper limit value is simply measured, measurement is performed with a lower PMT-applied voltage, and in the case where the upper limit value is detected again, the PMT-applied voltage is repeatedly reduced. Then, this is automatically repeated until the measured value falls to or below the upper limit value, thus adjusting the overall PMT value. It should be noted that in the case where the measured value exceeds the upper limit value, a true value is unknown. Therefore, it becomes unknown to which fraction the intensity should be adjusted, thus requiring trials and errors. Following the adjustment of the PMT value, the fluorescence spectrum detection section 21 measures sample data of a certain number of fine particles, and the data recording section 24 records the measured sample data for storage.

In step S402, a display section of the user interface 15 displays, in a graph form, the sample data measured in step S401. The user selects effective data from the displayed graph by setting a range of fine particles to be analyzed.

In step S403, the multiplication factor setting section 31 calculates a significant maximum value of all the channels of the PMT 17 in a group of pieces of effective data selected in step S402. The multiplication factor setting section 31 calculates a ratio between the calculated maximum value and the measurement upper limit value, finds a value for adjusting the maximum value of each channel of the PMT 17 to a value near the measurement limit value, and individually sets a multiplication factor (gain) for each channel of the PMT 17. Also, the correction factor calculation section 32 calculates a correction factor for restoring, to its original waveform, the reciprocal of the gain value found to multiply the detected value.

In step S404, the equipment control section 23 first individually sets gains of each PMT 17. When gains are set individually for each PMT 17, the fluorescence spectrum detection section 21 carries out sample measurement to proceed with actual analysis. The data recording section 24 records sample measurement data for storage.

In step S405, the spectrum generation section 33 performs calculation by multiplying all the data measured in step S404 by the correction factor for each channel and reproduces a common fluorescence spectrum shape lost in the separate gain setting, thus generating spectral data.

In step S406, the reference spectrum calculation section 35 calculates and prepares a reference spectrum for each fluorescent dye required for analysis conducted by the spectrum-type flow cytometer 1 from single-stained sample data generated by the correction made in step S405. Also in step S406, the spectrum separation section 36 performs fluorescence separation (unmixing process) on corrected multi-stained samples by using the weighted least squares method (WLSM). When the weighted least squares method is used in this unmixing process, fixed noise can be optimized by reflecting the correction factor value in the weight parameter, thus realizing a more accurate fluorescence separation process.

(2-4) Working Examples

A description will be given of a detailed operation example in each step of the processing operation of the spectrum-type flow cytometer 1 of the present embodiment by using working examples illustrated in FIGS. 5 to 18.

Measurement Example of the Condition Setting Sample (S401)

Figure 5:
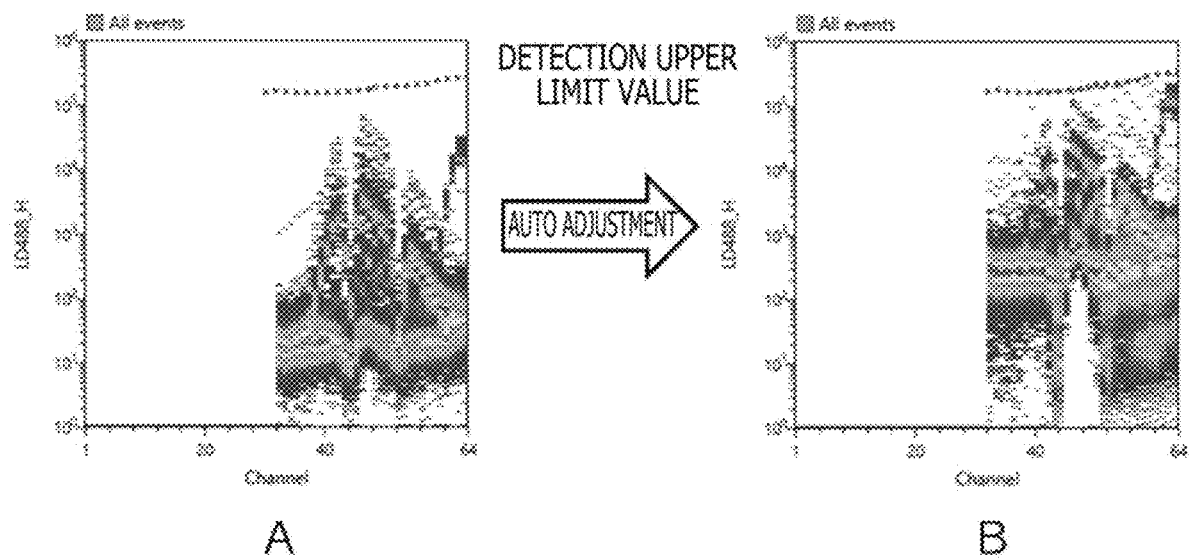
FIG. 5 depicts graphs illustrating excitation spectrum charts when single-stained particles of fluorescent dyes acquired by measurement using the fine particle measurement apparatus of the first embodiment according to the present technology are mixed.

FIG. 5 depicts graphs acquired by measurement using the spectrum-type flow cytometer 1 illustrating excitation spectrum charts of 488 nm excitation when single-stained particles of five fluorescent dyes are mixed. FIG. 5A illustrates an excitation spectrum chart before automatic adjustment of the gain of each PMT 17, and FIG. 5B illustrates an excitation spectrum chart after the automatic adjustment of the gain of each PMT 17. The horizontal axes of FIG. 5 represent the channels of the PMT 17, and the vertical axes thereof represent the fluorescence signal intensity.

Figure 6:
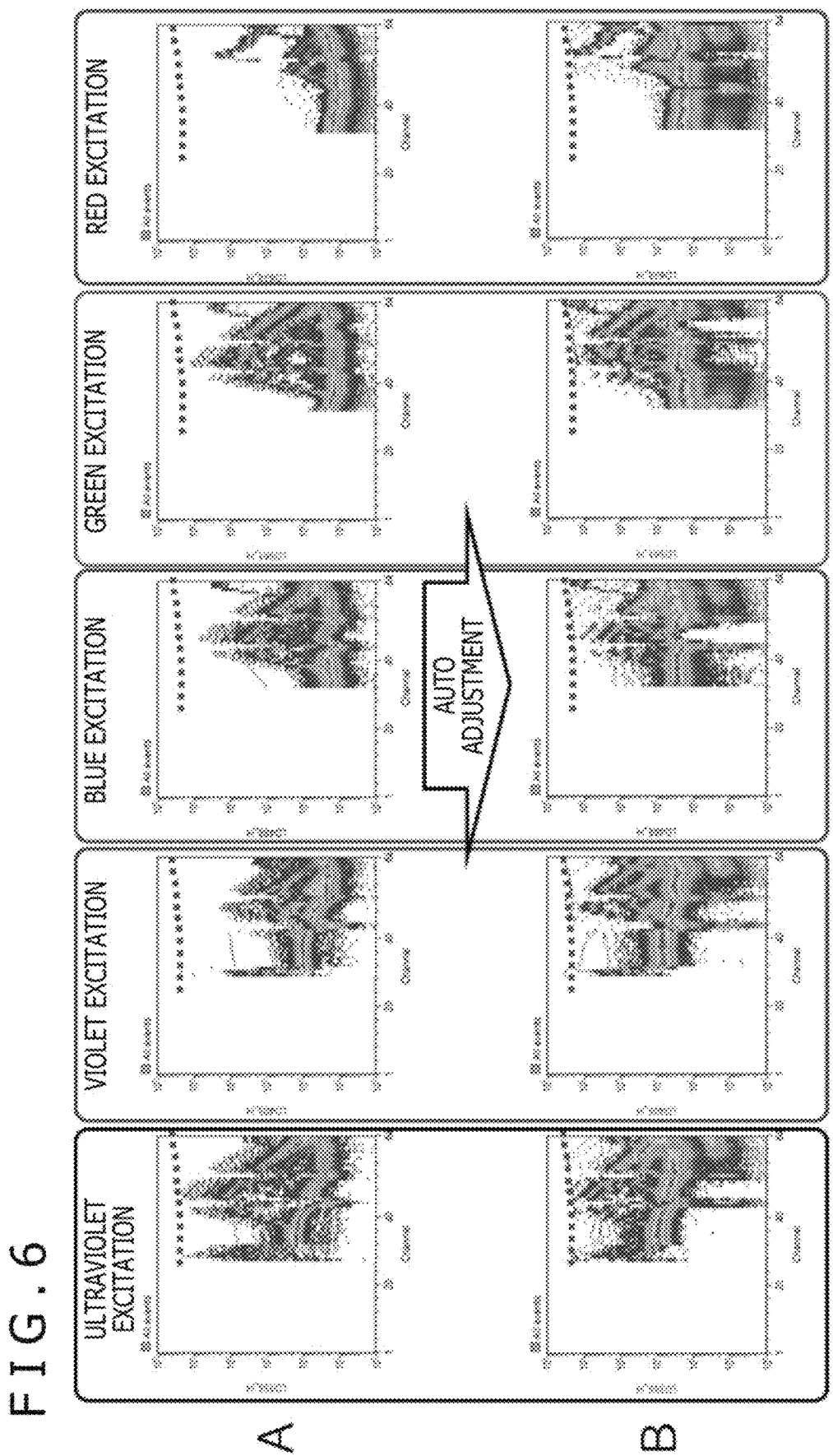
FIG. 6 depicts graphs, each illustrating an excitation spectrum chart of a single-stained particle for each fluorescent dye acquired by measurement using the fine particle measurement apparatus of the first embodiment according to the present technology.

FIG. 6 depicts graphs acquired by measurement using the spectrum-type flow cytometer 1, each illustrating an excitation spectrum chart of 488 nm excitation of single-stained particles for each of the five fluorescent dyes. FIG. 6A illustrates an excitation spectrum chart for each dye before the automatic adjustment of the gain of each PMT 17, and FIG. 6B illustrates an excitation spectrum chart for each dye after the automatic adjustment of the gain of each PMT 17. The horizontal axes of FIG. 6 represent the channels of the PMT 17, and the vertical axes thereof represent fluorescence signal intensity.

In step S401 where the condition setting sample is measured, for example, a multi-stained sample stained with all fluorescent dyes used for measurement or a mixture of all single-stained samples is used. As illustrated in FIG. 5A, a certain number of pieces of data are measured while, at the same time, this sample is delivered to the flow cytometer. Thereafter, the PMT channel that indicates the maximum value of all the measurement data and the maximum value itself are found. Then, as illustrated in FIG. 5B, the gains of all the array-type PMT are automatically adjusted uniformly such that the maximum value is a detection upper limit value.

Also, it is common in an array-type PMT that in the case where the gains are uniformly increased or decreased, the measured values also increase or decrease uniformly at the same ratio. For this reason, as illustrated in FIGS. 6A and 6B, even in the case where a plurality of excitation lasers and a plurality of array-type PMTs 17 are provided, uniformly increasing or decreasing the gains of the PMTs 17 allows for measurement with almost no change to the spectrum shapes of the fluorescent dyes albeit a slight impact of individual differences between the PMTs 17. The condition setting sample is measured while this fluorescence spectrum shape is maintained, with the optimal PMT gain settings.

Example of Selecting Effective Data (S402)

Figure 7:
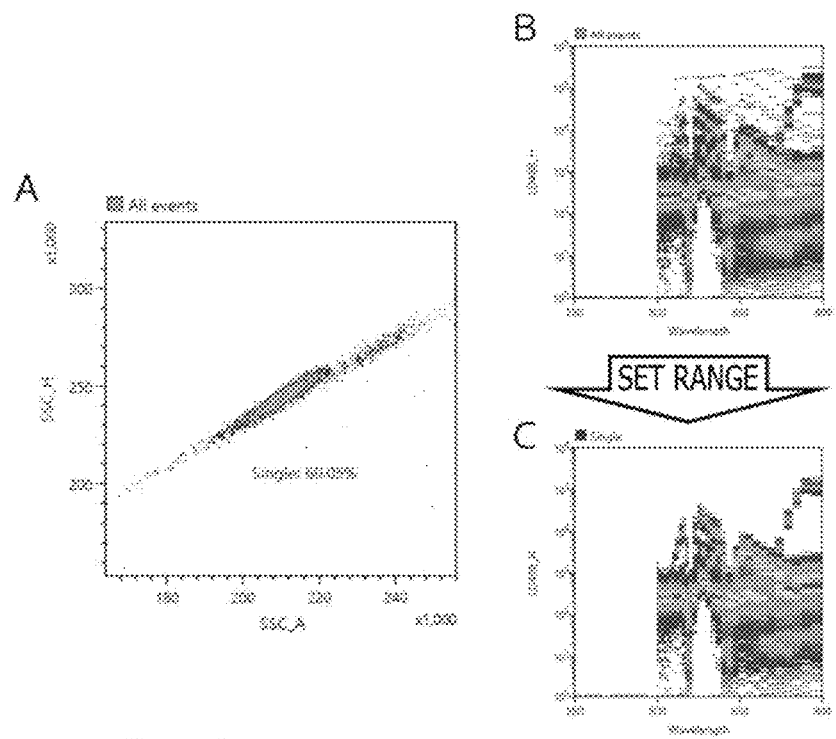
FIG. 7 depicts graphs illustrating effective data selected in a condition setting sample acquired by measurement using the fine particle measurement apparatus of the first embodiment according to the present technology.

FIG. 7 depicts graphs illustrating effective data selected in the condition setting sample acquired by measurement using the spectrum-type flow cytometer 1. FIG. 7A is a histogram illustrating a distribution of a cell count frequency of gated fine particles obtained by selecting (gating) only a cell population of interest in a measured sample. The horizontal axis in FIG. 7A represents a cumulative value of side scattering intensity, and the vertical axis represents the maximum value of side scattering intensity. FIG. 7B illustrates an excitation spectrum chart before the automatic adjustment of the gain of each PMT 17. FIG. 7C illustrates an excitation spectrum chart after the automatic adjustment of the gain of each PMT 17. The horizontal axes of FIGS. 7B and 7C represent the wavelength of the PMT 17, and the vertical axes thereof represent the fluorescence signal intensity.

In step S402 where effective data is selected, measurement results of the condition setting sample are displayed on the display section of the user interface 15 in a graph form so that the user can set a data range to be analyzed. In measurements using the spectrum-type flow cytometer 1, biological samples such as cells are frequently used that include a variety of impurities. There are cases in which, in this measurement, particles to be analyzed are extremely small in number such as one in a million. Therefore, a variety of requirements, varying from one user to another, exist, thus making it difficult to automatically select effective data. For this reason, the selection of effective data, a reference for adjusting individual gains of the PMT 17, is conducted by the user by setting a gate for the effective range while at the same time watching the graph being displayed, extracting a data group free from impurities and so on, and selecting effective data, serving as a reference for adjusting individual gains of the PMT 17.

Example of Setting an Individual PMT Gain and Calculating a Correction Factor (S403)

Figure 8:
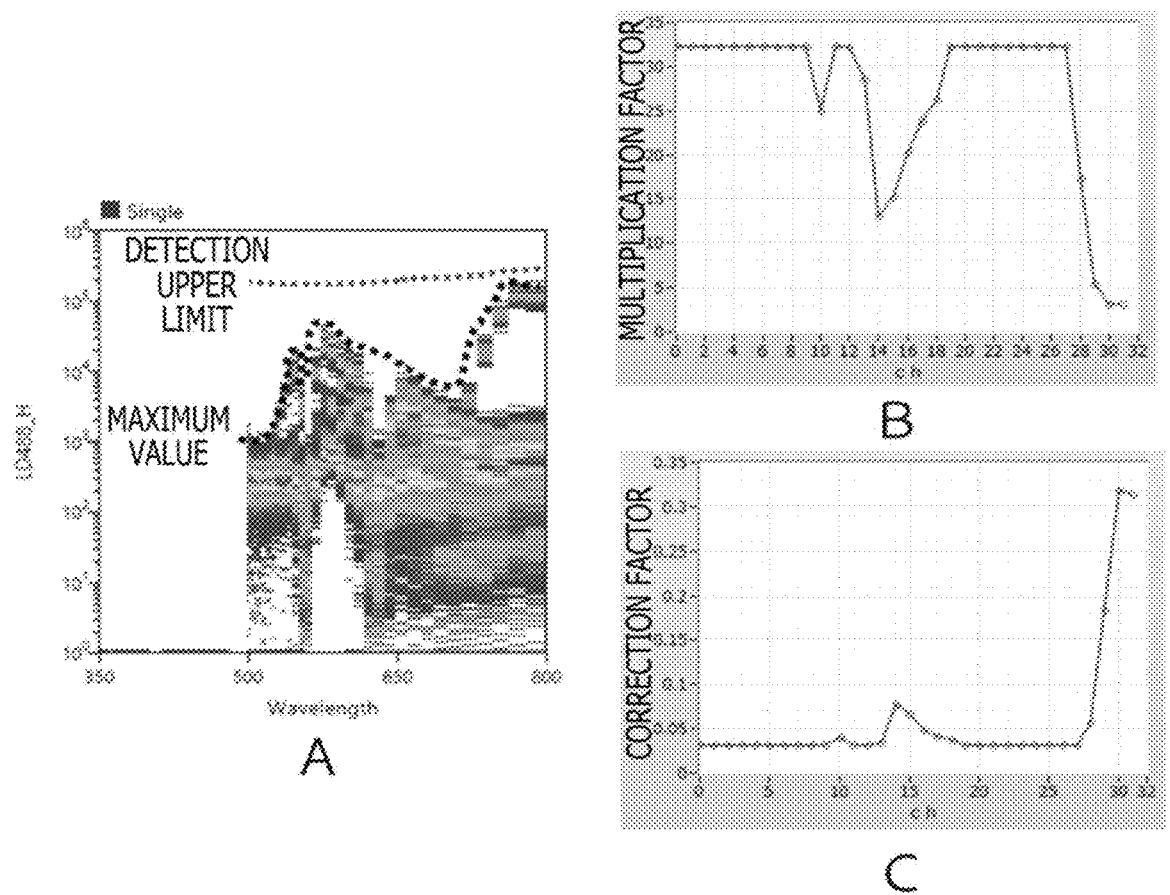
FIG. 8 depicts graphs illustrating individual PMT gain setting values and correction factor values found from five pieces of fluorescent dye data of the first embodiment according to the present technology.

FIG. 8 depicts graphs illustrating individual PMT gain setting values and correction factor values of the PMT 17 found from five pieces of fluorescent dye data of the spectrum-type flow cytometer 1. FIG. 8A is a diagram illustrating the maximum value and the detection upper limit value for each channel of the PMT 17 for the selected and set effective data. The horizontal axis of FIG. 8A represents the wavelength, and the vertical axis thereof represents the fluorescence signal intensity. FIG. 8B illustrates the multiplication factor (gain) of each PMT 17 found from the five pieces of fluorescent dye data, and FIG. 8C illustrates the correction factor of each PMT 17 found from the five pieces of fluorescent dye data. The horizontal axes of FIGS. 8B and 8C represent the channels of the PMT 17, and the vertical axes thereof represent the multiplication factor and the correction factor.

In step S403 where an individual PMT gain is set and a correction factor is calculated, the maximum value of each channel of the PMT 17 is calculated for the set effective data. Then, an estimation is made as to how many times the data can be multiplied from the difference from the detection upper limit value to allow for measurement without saturation, thus calculating an individual gain of each channel of the PMT 17. In order to avoid expansion of undesired noise components at the time of this calculation, a gain upper limit may be provided, depending on the configuration of the optical filter or the excitation laser, for regions where the signals are extremely small from the point of view of setting. FIG. 8B illustrates the multiplication factor of each PMT 17 found from the five pieces of fluorescent dye data, and an upper limit of approximately 30 folds is set from reference measurement results. Also, FIG. 8C illustrates the reciprocal value of the multiplication factor, and this value is a correction factor required to reproduce the spectrum.

Example of Measuring a Sample (S404)

Figure 9:
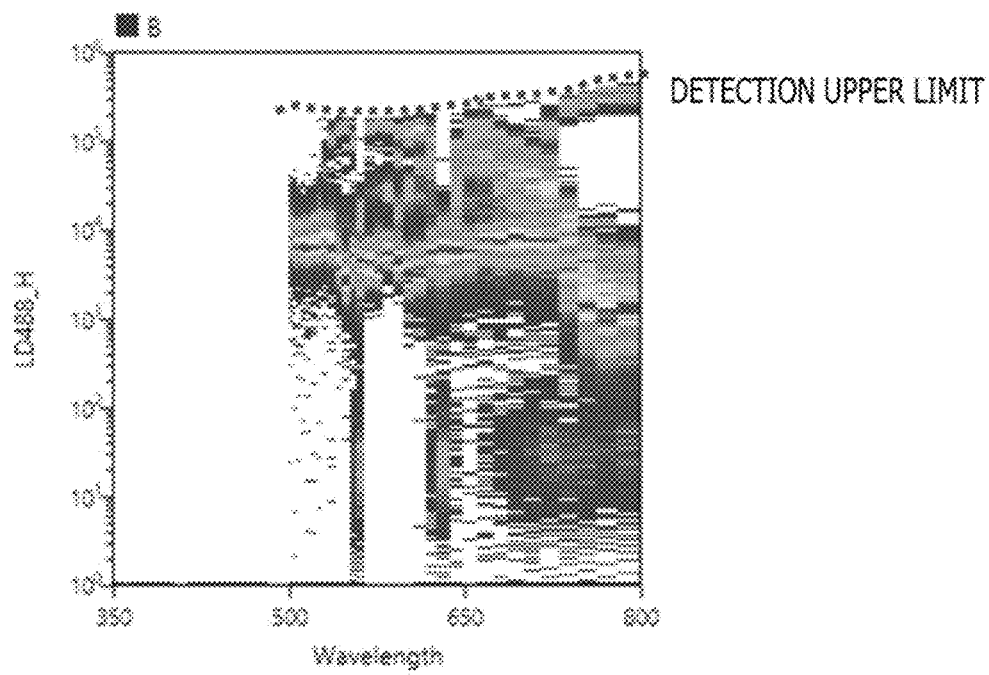
FIG. 9 is a diagram illustrating a state in which each PMT channel has been individually adjusted in gain to an upper limit value for the selected effective data of the first embodiment according to the present technology.

FIG. 9 is a diagram illustrating a state in which each channel of the PMT 17 has been individually adjusted in gain to the upper limit value for the selected and set effective data. The horizontal axis of FIG. 9 represents the wavelength, and the vertical axis thereof represents the fluorescence signal intensity.

In step S404 where a sample is measured, not only a single-stained sample and an unstained sample for preparing reference spectra but also a multi-stained sample to be analyzed are measured with each channel of the PMT 17 individually adjusted in gain to its upper limit value. It is expected that measurement results of many channels of the PMT 17 stand, as illustrated in FIG. 9, at the upper limit when the multi-stained sample is measured.

Example of Calculating a Correction Factor (S405)

Figure 10:
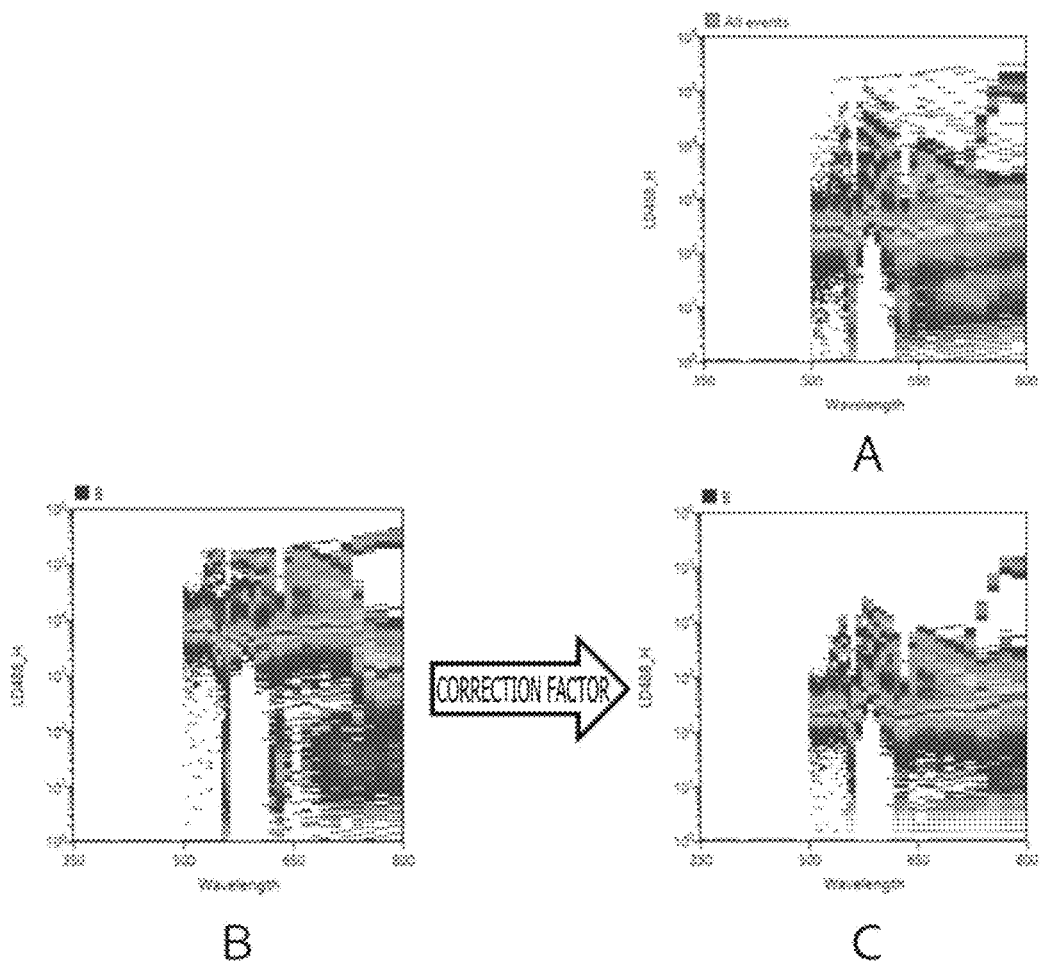
FIG. 10 depicts diagrams describing a correction factor calculation process for data including the five pieces of fluorescent dye data using the fine particle measurement apparatus of the first embodiment according to the present technology.

FIG. 10 depicts diagrams describing a correction factor calculation process for data including the five pieces of fluorescent dye data using the spectrum-type flow cytometer 1. FIG. 10A illustrates a spectrum shape in which all the channels of the PMT 17 are uniformly adjusted in gain to the measurement upper limit. FIG. 10B illustrates a spectrum shape in which each channel of the PMT 17 is individually adjusted in gain to the measurement upper limit. FIG. 10C illustrates a fluorescence spectrum shape in which the measurement data illustrated in FIG. 10B is multiplied by a correction factor. The horizontal axes of FIGS. 10A to 10C represent the wavelength, and the vertical axes thereof represent the fluorescence signal intensity.

In step S405 where a correction factor is calculated, the data measured with each channel of the PMT 17 adjusted in gain to the measurement upper limit is multiplied by a correction factor, thus reproducing a fluorescence spectrum shape. It is clear from the spectrum shape after correction illustrated in FIG. 10C that a spectrum shape is reproduced that is approximately equivalent to that measured by uniformly adjusting all the channels of the PMT 17 in gain illustrated in FIG. 10C. Also, FIGS. 10A and 10B illustrate that the channels measured with each of the PMTs 17 individually adjusted in gain to the measurement upper limit realize measurement with less fixed noise than in the case where all the PMTs 17 are uniformly adjusted in gain.

Example of Preparing a Reference Spectrum and Performing the Unmixing Process (S406)

Figure 11:
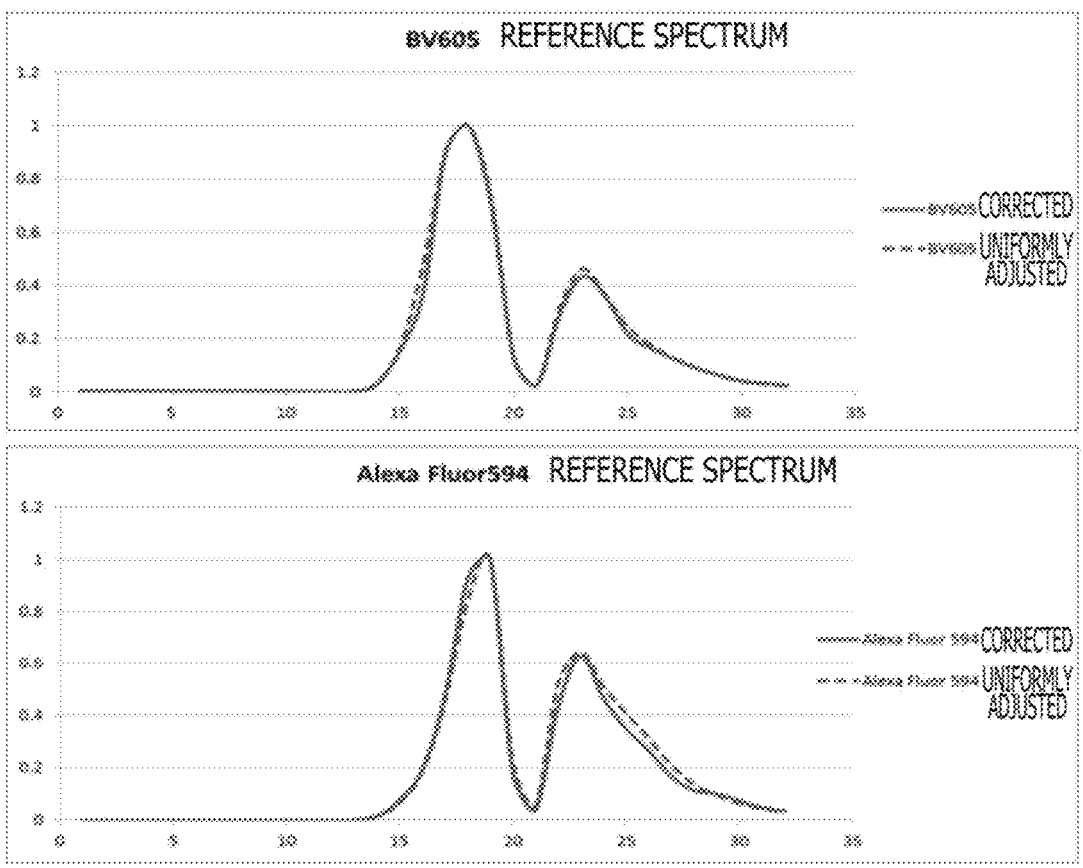
FIG. 11 depicts graphs illustrating reference spectra calculated using the fine particle measurement apparatus of the first embodiment according to the present technology.

FIG. 11 depicts graphs illustrating reference spectra calculated using the spectrum-type flow cytometer 1. FIG. 11A illustrates a calculated reference spectrum of fluorescent dye BV 510, and FIG. 11B illustrates a calculated reference spectrum of Alexa Fluor 594. The horizontal axes of FIG. 11 represent the wavelength, and the vertical axes thereof represent the standardized fluorescence signal intensity.

In step S406 where reference spectra are prepared, mean values and so on are calculated from measurement data of a corrected single-stained sample, thus calculating standard spectra. As illustrated in FIGS. 11A and 11B, it is clear that the spectrum (dotted line) obtained by uniformly adjusting the gains of the PMT 17 array and the spectrum (solid line) obtained by individually adjusting each gain of the PMT 17 array first and then making measurement and multiplying the measurement data by the correction factor are approximately the same. As described above, following the operation procedure of the fine particle measurement apparatus of the present embodiment makes it possible to reproduce the spectrum shape of the uniformly adjusted gains by individually adjusting the gains of the PMT 17 array, and even in the case where measurement is made with different individual gain settings because of increase or decrease in number of fluorescent dyes, the reference spectrum can be diverted.

Figure 12:
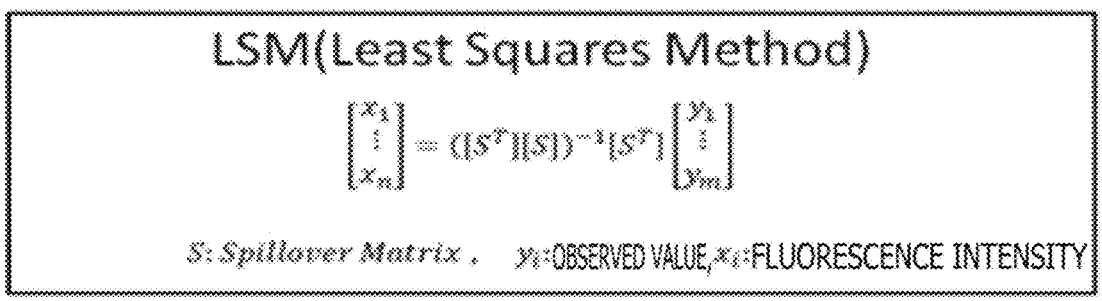
FIG. 12 depicts calculation formulas for an ordinary least squares method (LSM) and a weighted least squares method (WLSM) for unmixing in which fluorescence separation is conducted on a multi-stained sample using the reference spectrum.
Figure 12:
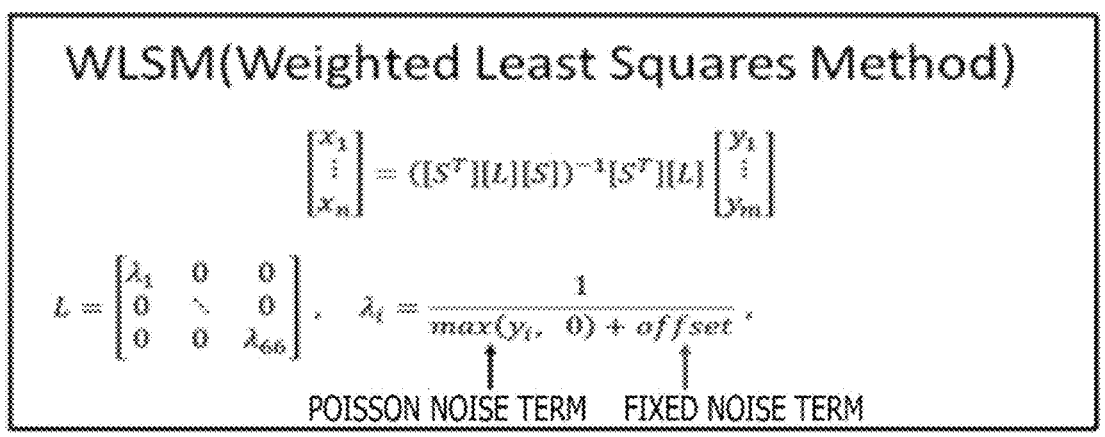

FIG. 12 depicts calculation formulas for performing fluorescence separation of a multi-stained sample using the reference spectrum. FIG. 12A illustrates the ordinary least squares method (LSM) for unmixing, and FIG. 11B illustrates the ordinary weighted least squares method (WLSM) for unmixing.

In step S406 where the unmixing process is performed, the unmixing process (fluorescence separation) is performed by using the weighted least squares method (WLSM) on the multi-stained sample corrected in step S405. In the case where the LSM is used here, data with small signal levels is not so important. However, in the case where the WLSM is used, data of each channel of the PMT 17 is effectively used by assigning weights to the signal magnitudes. As a result, data with small signal levels has a greater impact. However, as far as data with excessively small signal levels is concerned, 'Offset,' a parameter reflecting fixed noise of equipment, is normally set to restrict the impact thereof.

The present technology allows for measurement with a reduced level of this fixed noise by individually optimizing the gain of each PMT 17. For this reason, more advanced fluorescence separation capability can be delivered by adjusting the 'Offset' term to match with the measurement data during analysis using the WLSM. Simply speaking, it is possible to perform optimal analysis by multiplying the 'Offset' term, a normally uniform term, by a factor responsive to the correction factor used for the measurement data.

[Setting Individual Gains and Compatibility of the Correction Factor]

A description will be given of setting of individual gains of the array-type PMT 17, one of important elements of the present technology, and compatibility of the correction factor value by using FIGS. 13 and 14. Here, as far as the characteristics in the initial state are concerned, the relationship between the voltage applied to the PMT 17 and the gain can be estimated with high accuracy by evaluating the PMT 17 alone.

Figure 13:
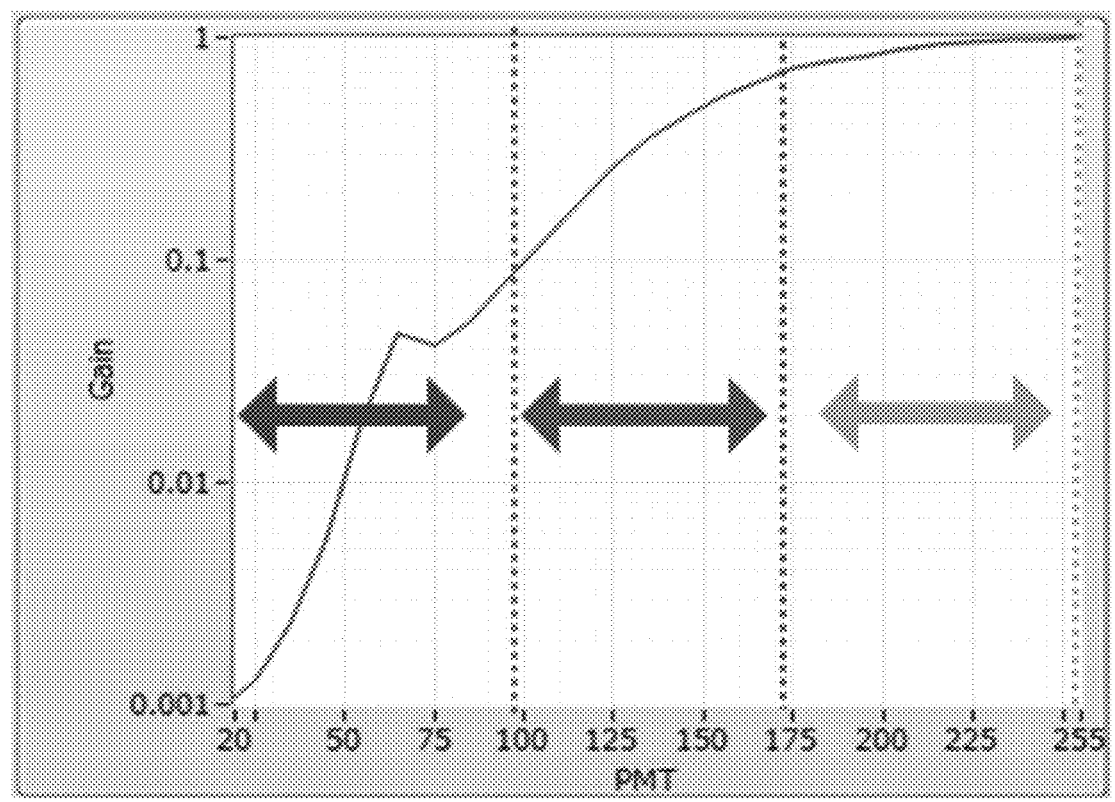
FIG. 13 is a graph illustrating an example of a characteristic curve of the first embodiment according to the present technology.

FIG. 13 is a graph illustrating an example of a characteristic curve given by a gain curve of the PMT 17. The horizontal axis of FIG. 13 represents the number of PMTs, and the vertical axis thereof represents the gain. As illustrated in FIG. 13, the characteristic curve of the present embodiment is not a monotonous one and, moreover, has a sharp change in gain, resulting in concern over possible characteristic change due to deterioration over time. For this reason, it is necessary to reevaluate the gain characteristics with the PMT 17 incorporated in the spectrum-type flow cytometer 1. However, the PMT 17 gain has an extremely wide range. As a result, if, simply, one fine particle is measured, the value will either saturate or produce an undetectable region. Also, although it is possible to calibrate fine particles by measuring the particles with gradually varying levels of brightness a plurality of number of times, errors among measurement processes or other problem will occur.

Figure 14:
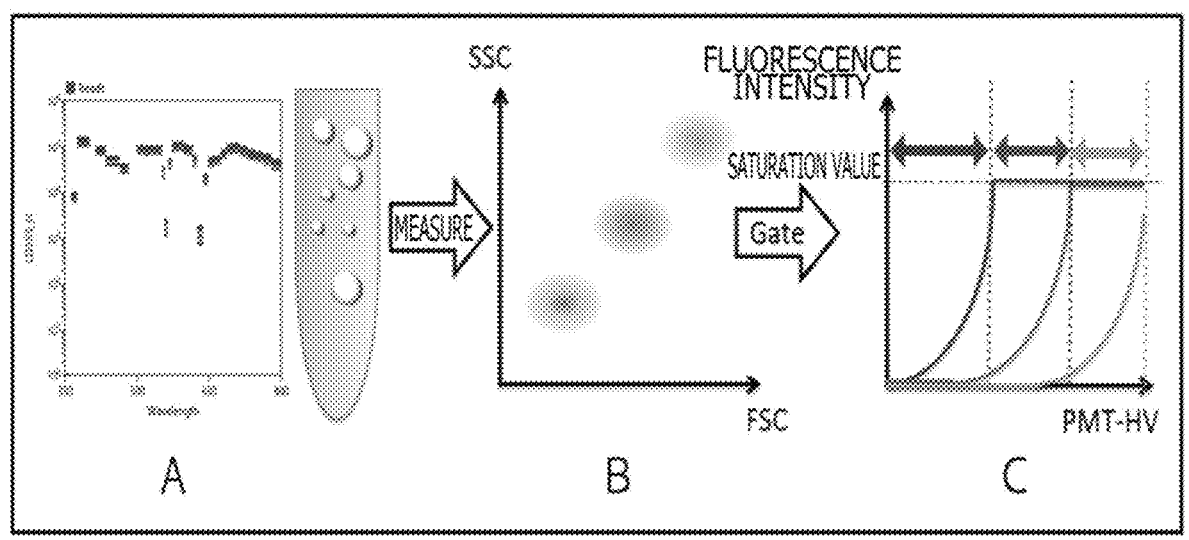
FIG. 14 depicts diagrams describing calibration using a sample having a mixture of a plurality of fine particles of the first embodiment according to the present technology.

In order to resolve this problem, as illustrated in FIG. 14, calibration is performed by using a sample including a mixture of a plurality of fine particles including a substance with a broad fluorescence spectrum and having different grain sizes and different fluorescence intensities. FIG. 14A illustrates a spectrum shape of the mixture sample. The horizontal axis of FIG. 14A represents the wavelengths, and the vertical axis thereof represents the fluorescence signal intensity. FIG. 14B illustrates a measurement result of the sample including a mixture of a plurality of fine particles. The horizontal axis of FIG. 14B represents FSC (forward scatter), and the vertical axis thereof represents SSC (side scatter). FIG. 14C illustrates a gain characteristic of particles selected by setting a gate on the measurement data illustrated in FIG. 14B. The horizontal axis of FIG. 14C represents the voltage applied to the PMT, and the vertical axis thereof represents the fluorescence signal intensity.

As illustrated in FIG. 14C, forward scatter is related to grain size in an ordinary flow cytometer, thus making it possible to select particles by setting a gate apart from amount of fluorescence. By identifying, with that function, particles from measurement results of mixed particles and evaluating the characteristic of a high gain region of the PMT 17 with the small particles and the characteristic of a low gain region thereof with the large particles, it is possible to automatically calibrate, on a single measurement occasion, the gain characteristic of the array-type PMT 17 that spans a wide range.

[Measuring Peak Beads]

Figure 15:
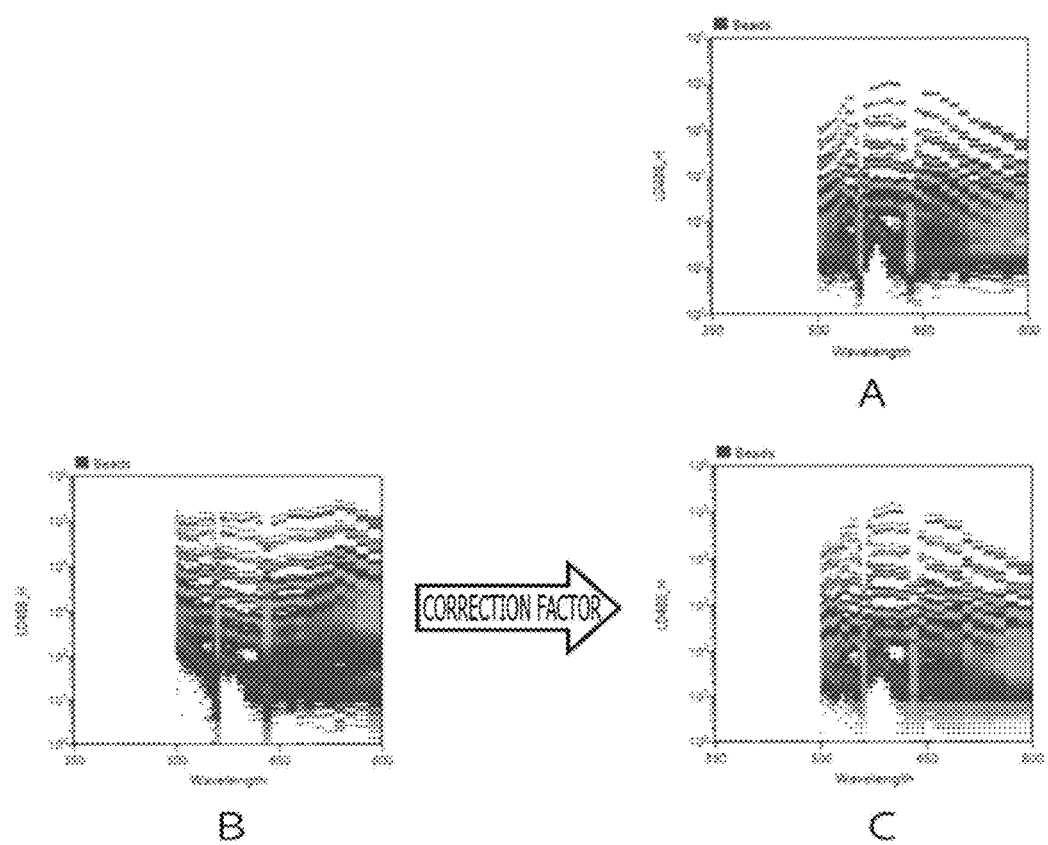
FIG. 15 depicts diagrams illustrating eight-peak beads measurement in which fine particles whose fluorescence intensities for sensitivity evaluation of the first embodiment according to the present technology are adjusted into eight levels are mixed.

A description will be given of measurement of peak beads of the present embodiment by using FIGS. 15 to 18. FIG. 15 depicts diagrams illustrating measurement of eight-peak beads in which fine particles whose fluorescence intensities for sensitivity evaluation are adjusted into eight levels are mixed. FIG. 15A illustrates a spectrum shape in which all the channels of the PMT 17 are uniformly adjusted in gain to the measurement upper limit. FIG. 15B illustrates a spectrum shape in which each channel of the PMT 17 is individually adjusted in gain to the measurement upper limit. FIG. 15C illustrates a fluorescence spectrum shape in which the measurement data illustrated in FIG. 15B is multiplied by a correction factor. The horizontal axes of FIGS. 15A to 15C represent the wavelength, and the vertical axes thereof represent the fluorescence signal intensity.

Figure 16:
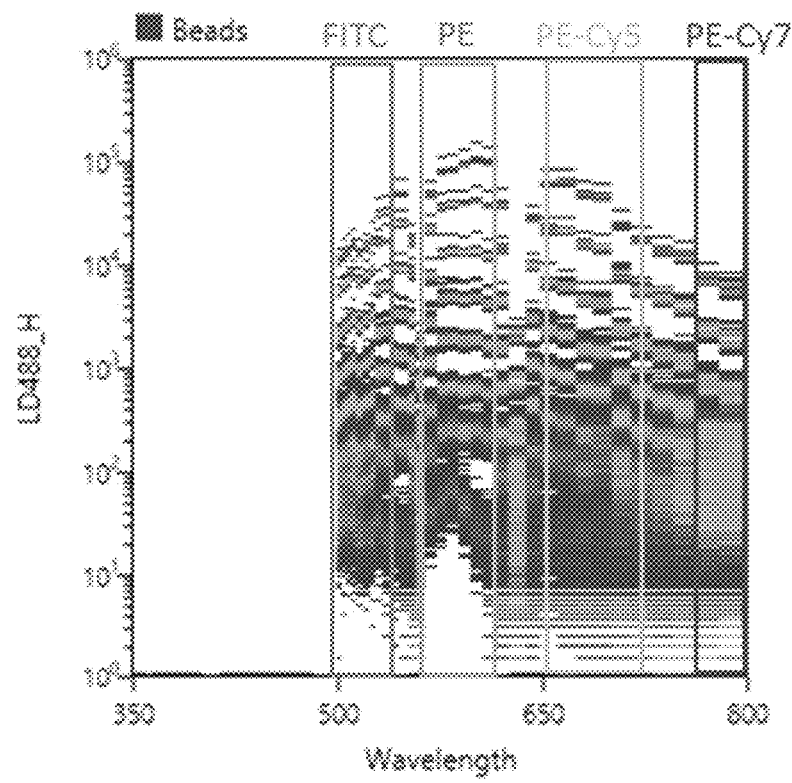
FIG. 16 is a diagram illustrating spectrum shapes from which data has been cut out for respective typical fluorescent wavelength bands of typical fluorescent dyes of the first embodiment according to the present technology.
Figure 17:
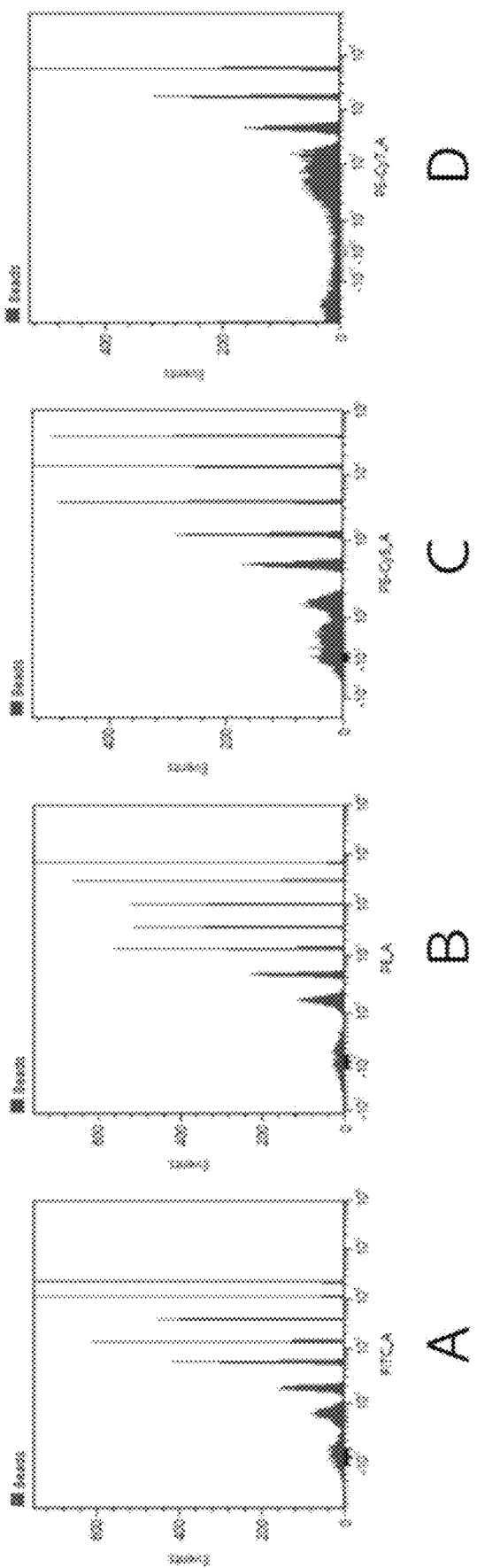
FIG. 17 depicts graphs illustrating an example of a plot of capability to separate eight peaks for the respective typical fluorescent wavelength bands of the typical fluorescent dyes of the first embodiment according to the present technology.
Figure 18:
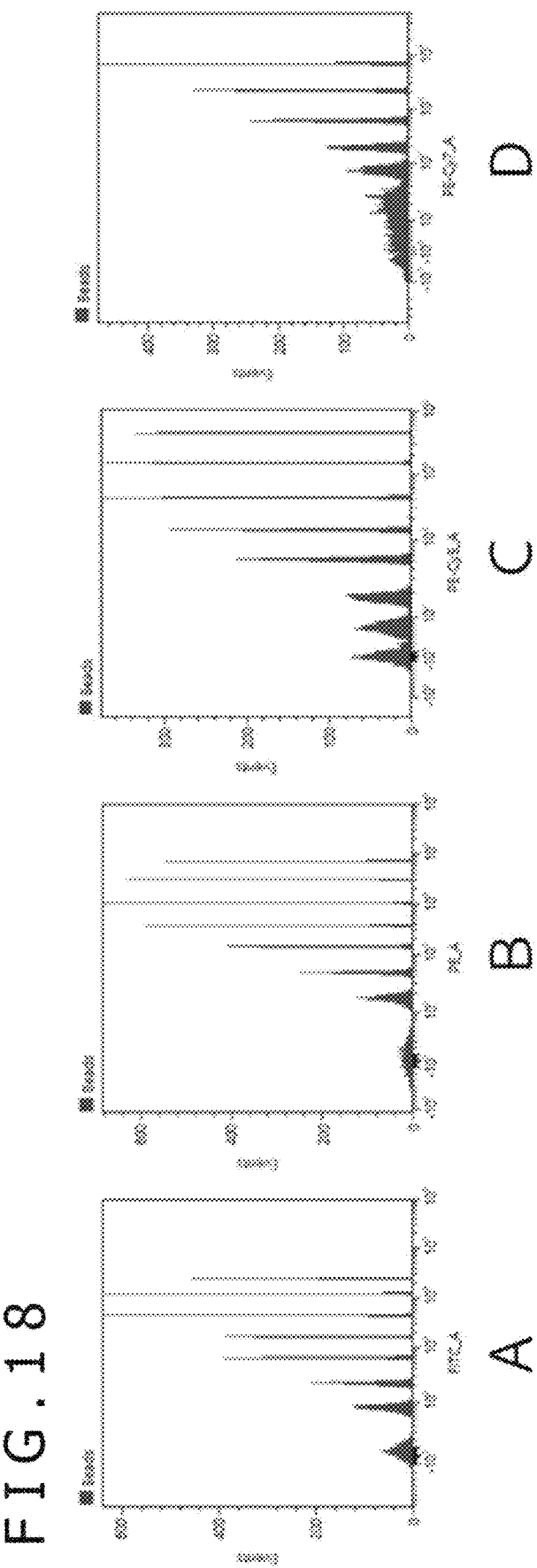
FIG. 18 depicts graphs illustrating an example of a plot of capability to separate eight peaks for the respective typical fluorescent wavelength bands of the typical fluorescent dyes of the first embodiment according to the present technology.

FIG. 16 is a diagram illustrating spectrum shapes from which data has been cut out for respective typical fluorescent wavelength bands of typical fluorescent dyes. The horizontal axis of FIG. 16 represents the wavelength, and the vertical axis thereof represents the fluorescence signal intensity. FIG. 17 depicts graphs illustrating an example of a plot of capability to separate eight peaks by uniformly adjusting all the channels of the PMT 17 in gain to the measurement upper limit. FIG. 18 depicts graphs illustrating an example of a plot of capability to separate eight peaks by individually adjusting each channel of the PMT 17 in gain to the measurement upper limit. The horizontal axes of FIGS. 17 and 18 represent the wavelength, and the vertical axes thereof represent the particle count.

As illustrated in FIG. 15, in order to confirm a fixed noise reduction effect in the case where each channel of the PMT array is individually set in gain, measurement was made on eight peak beads that included a mixture of particles whose fluorescence intensities for sensitivity evaluation had been adjusted into eight levels. Then, as illustrated in FIGS. 16 to 18, data was cut out for each typical fluorescent wavelength band of a typical fluorescent dye, and the separation capability of eight peaks of the data cut out was plotted. As illustrated in FIGS. 17 and 18, it has been found that although the separation capability in a PE region where the fluorescence intensities of the eight peak beads are originally high remains almost unchanged, dark beads are clearly distinguished between each other in other regions, namely, FITC, PE-CY5, and PE-Cy7 regions. At this time, it has also been found that a spectrum shape has been achieved because the mean values of the fluorescence intensities of the respective beads are approximately the same. From this result, it has been confirmed that the operation procedure of the present technology has realized reduction in fixed noise during measurement in each of the channels of the PMT 17 with a scant amount of fluorescence while at the same time achieving a spectrum shape.

As described above, the spectrum-type flow cytometer 1 of the present embodiment allows for measurement in a low fixed noise condition in all wavelength bands by optimizing the voltages of the PMT 17, thereby ensuring improved separation capability of fluorescent dyes. Also, the spectrum-type flow cytometer 1 allows for increase in the number of dyes that can be used simultaneously thanks to improved separation capability of adjacent dyes.

Also, the spectrum-type flow cytometer 1 automatically calculates the PMT voltage settings in optimal conditions simply by measuring a multi-stained sample, thus easing the user's burden to prepare a number of parameters.

Also, the spectrum-type flow cytometer 1 allows for diversion of a reference spectrum used for fluorescence separation by performing analysis on measurement results using a correction factor that has taken the gains of the PMT 17 into consideration. Then, it is possible to ease a burden of measuring single-stained samples every time even under different measurement conditions.

Further, if the gain characteristic of the PMT 17 changes over time, the spectrum-type flow cytometer 1 can update the gain characteristic data with the PMT 17 left undetached simply by measuring a reference sample, thus providing optimal measurement conditions at all times.

3. Hardware Configuration Example

Figure 19:
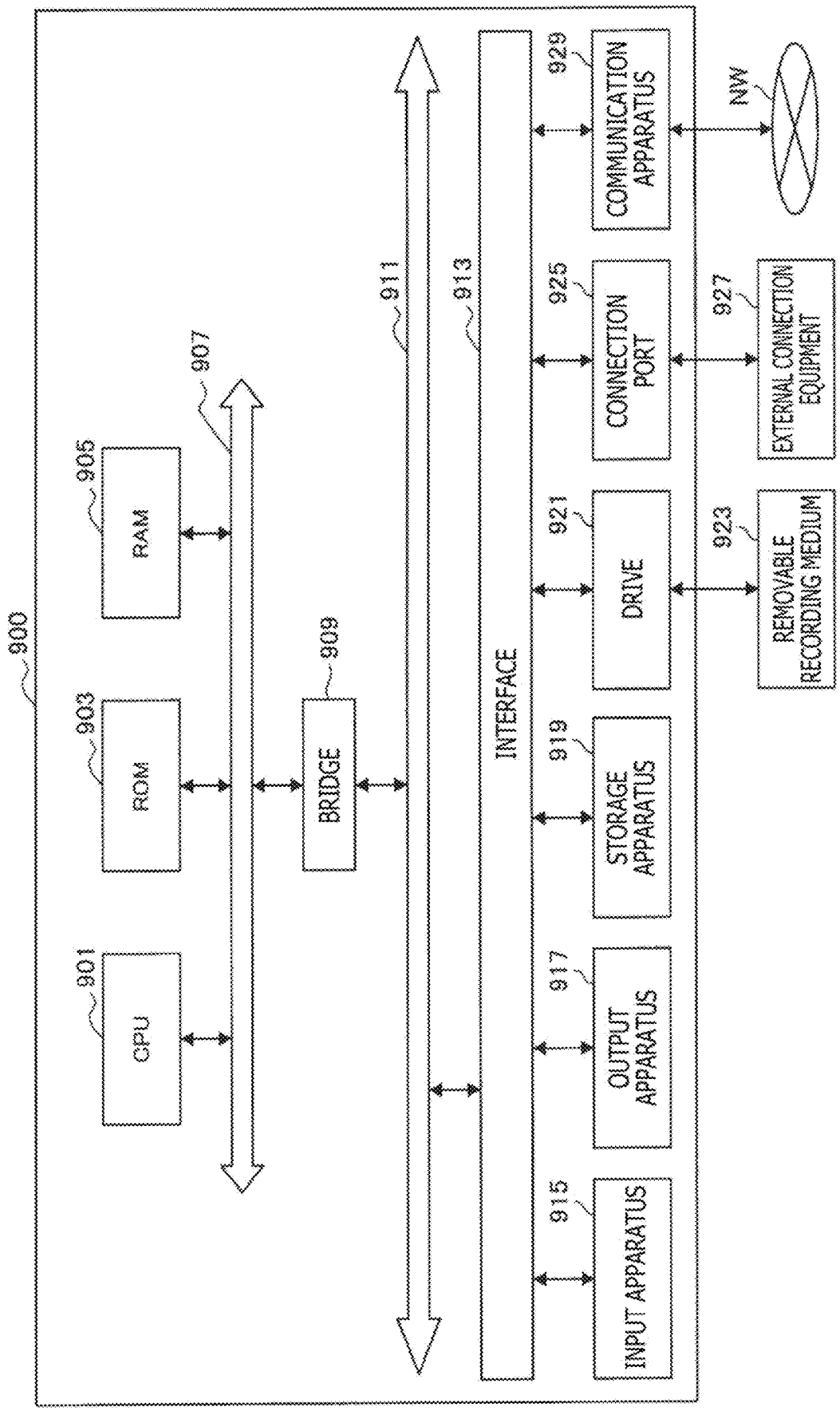
FIG. 19 is a block diagram illustrating a hardware configuration example of an information processing apparatus according to the present technology.

A description will be given next of a hardware configuration of an information processing apparatus according to an embodiment of the present disclosure with reference to FIG. 19. FIG. 19 is a block diagram illustrating a hardware configuration example of the information processing apparatus according to the present technology. An information processing apparatus 900 illustrated can realize, for example, an information processing apparatus 10 in the above embodiment.

The information processing apparatus 900 includes a CPU (Central Processing Unit) 901, a ROM (Read Only Memory) 903, and a RAM (Random Access Memory) 905. Also, the information processing apparatus 900 may include a host bus 907, a bridge 909, an external bus 911, an interface 913, an input apparatus 915, an output apparatus 917, a storage apparatus 919, a drive 921, a connection port 925, and a communication apparatus 929. The information processing apparatus 900 may have a processing circuit like one referred to as a DSP (Digital Signal Processor) or an ASI (Application Specific Integrated Circuit) in place of or together with the CPU 901.

The CPU 901 functions as an arithmetic processing apparatus and a control apparatus, controlling the whole or part of the operation of the information processing apparatus 900 in accordance with a variety of programs recorded in the ROM 903, the RAM 905, the storage apparatus 919, or a removable recording medium 923. For example, the CPU 901 controls the operation of each of functional sections included in the information processing apparatus 10 of the above embodiment as a whole. The ROM 903 stores programs, arithmetic parameters, and so on used by the CPU 901. The RAM 905 temporarily stores programs used for execution by the CPU 901 and parameters that change as appropriate during the execution. The CPU 901, the ROM 903, and the RAM 905 are connected to each other by the host bus 907 that includes a CPU bus and other internal buses. Further, the host bus 907 is connected to the external bus 911 such as PCI (Peripheral Component Interconnect/Interface) bus via the bridge 909.

The input apparatus 915 is an apparatus manipulated by the user such as a mouse, a keyboard, a touch panel, buttons, switches, and levers. The input apparatus 915 may, for example, be a remote-control apparatus using infrared radiation or other radio waves. Alternatively, the input apparatus 915 may be external connection equipment 927 such as a mobile phone that supports the manipulation of the information processing apparatus 900. The input apparatus 915 includes an input control circuit that generates an input signal on the basis of information input from the user and outputs the input signal to the CPU 901. The user inputs various pieces of data to the information processing apparatus 900 and issues an instruction to the information processing apparatus 900 to perform processing operation.

The output apparatus 917 includes an apparatus capable of notifying acquired information to the user either visually or aurally. The output apparatus 917 can be, for example, a display apparatus such as an LCD, a PDP, and an OELD, an acoustic output apparatus such as speaker and headphone, and a printer apparatus. The output apparatus 917 outputs results acquired by processing performed by the information processing apparatus 900 in the form of text or video such as images or in the form of audio such as acoustic signal.

The storage apparatus 919 is a data storage apparatus configured as an example of a storage apparatus of the information processing apparatus 900. The storage apparatus 919 includes, for example, a magnetic storage section device such as an HDD (Hard Disk Drive), a semiconductor storage device, an optical storage device, or a magneto-optical storage device. The storage apparatus 919 stores programs executed by the CPU 901 and various pieces of data used thereby, various pieces of data acquired from external equipment, and so on. It should be noted that the storage apparatus 919 can realize the function of a storage section 110 according to the above embodiment.

The drive 921 is a reader/writer for the removable recording medium 923 such as a magnetic disk, an optical disc, a magneto-optical disk, or a semiconductor memory and is built into or provided outside the information processing apparatus 900. The drive 921 reads out information stored in the inserted removable recording medium 923 and outputs the information to the RAM 905. Also, the drive 921 writes into records to the inserted removable recording medium 923.

The connection port 925 is provided for direct connection to the information processing apparatus 900. The connection port 925 can be, for example, a USB (Universal Serial Bus) port, an IEEE1394 port, an SCSI (Small Computer System Interface) port, or other port. Also, the connection port 925 may be an RS-232C port, an optical audio terminal, an HDMI (registered trademark) (High-Definition Multimedia Interface) port, or other port. Connection of the external connection equipment 927 to the connection port 925 allows for exchange of various types of data between the information processing apparatus 900 and the external connection equipment 927.

The communication apparatus 929 is a communication interface that includes, for example, a communication device for connecting to a communication network NW, and other devices. The communication apparatus 929 can be, for example, a communication card for a wired or wireless LAN (Local Area Network), Bluetooth (registered trademark), or a WUSB (Wireless USB), and so on. Also, the communication apparatus 929 may, for example, be an optical communication router, an ADSL (Asymmetric Digital Subscriber Line) router, a modem for various types of communication, or other device. The communication apparatus 929 sends and receives signals and so on by using a predetermined protocol such as TCP/IP, for example, to and from the Internet and other pieces of communication equipment. Also, the communication network NW connected to the communication apparatus 929 is a network connected in a wired or wireless manner and includes, for example, the Internet, a home LAN, infrared communication, radio wave communication, or satellite communication.

It should be noted that the steps of the processes performed by the information processing apparatus of the present specification are not necessarily required to be processed chronologically in accordance with the sequence described as a flowchart. For example, the steps of the processes performed by the information processing apparatus may be processed in a sequence different from that described as a flowchart or may be processed in parallel.

Also, a computer program can be prepared that allows hardware such as the CPU, the ROM, and the RAM built into the information processing apparatus to achieve equivalent functions to those of the respective components of the information processing apparatus described above. It should be noted that a storage medium storing the computer program is also provided.

Also, the effect described in the present specification is merely descriptive or illustrative and not restrictive. That is, the technology according to the present disclosure can deliver, from the description given in the present specification, an effect apparent to those skilled in the art together with or in place of the above effect.

Also, embodiments according to the present technology are not limited to the above embodiments and can be modified in various ways without departing from the gist of the present technology.

Also, the effect described in the present specification is merely illustrative and not restrictive, and there may be other effects.

Also, the present technology can have the following configurations:

(1)

A spectrum-type fine particle measurement apparatus including:

a detection section having a plurality of detectors for detecting light from fine particles;

a multiplication factor setting section adapted to set a multiplication factor for each of the plurality of detectors;

a correction factor calculation section adapted to calculate a correction factor on the basis of the set multiplication factor; and a spectrum generation section adapted to generate spectral data by correcting a value detected by the detector, with the calculated correction factor.

(2)

The fine particle measurement apparatus of feature (1), further including:

an equipment control section adapted to individually adjust the multiplication factor for each of the plurality of detectors.

(3)

The fine particle measurement apparatus of feature (1), further including:

a data adjustment section adapted to automatically adjust a maximum value detected by the detection section to a predetermined threshold on the basis of the set multiplication factor.

(4)

The fine particle measurement apparatus of feature (3), in which the predetermined threshold is a detection upper limit value of the detector.

(5)

The fine particle measurement apparatus of feature (1), further including:

a reference spectrum calculation section adapted to calculate a reference spectrum on the basis of the generated spectral data.

(6)

The fine particle measurement apparatus of feature (3), further including:

a spectrum separation section adapted to separate spectra by using the calculated reference spectrum.

(7)

The fine particle measurement apparatus of feature (6), in which the spectrum separation section performs a spectral separation process by using a weighted least squares method that assigns weights on the basis of the calculated correction factor.

(8)

The fine particle measurement apparatus of feature (1), in which the multiplication factor setting section sets the multiplication factor on the basis of a voltage applied to the detector.

(9)

The fine particle measurement apparatus of feature (1), in which the correction factor is a value based on uniformity of the detector, a wavelength band width detected for each of the plurality of detectors, or wavelength dependence of photoelectric conversion.

(10)

The fine particle measurement apparatus of feature (1), in which the multiplication factor setting section automatically sets the multiplication factor from a single piece of measurement data of a sample including a mixture of single-stained samples stained with a single fluorescent dye or a multi-stained sample stained with all fluorescent dyes.

(11)

The fine particle measurement apparatus of feature (1), in which the correction factor calculation section automatically calculates the correction factor from a single piece of measurement data of a sample including a mixture of single-stained samples stained with a single fluorescent dye or a multi-stained sample stained with all fluorescent dyes.

(12)

The fine particle measurement apparatus of feature (1), further including:

a detector evaluation section adapted to evaluate the detector by using measurement data of a mixture of a plurality of fine particles having different grain diameters and different fluorescence intensities.

(13)

An information processing apparatus including:

a multiplication factor setting section adapted to set a multiplication factor for each of a plurality of detectors, the detectors detecting light from fine particles;

a correction factor calculation section adapted to calculate a correction factor on the basis of the set multiplication factor; and a spectrum generation section adapted to generate spectral data by correcting a value detected by the detector, with the calculated correction factor.

(14)

An information processing method including:

by a processor, a step of setting a multiplication factor for each of a plurality of detectors, the detectors detecting light from fine particles;

a step of calculating a correction factor on the basis of the set multiplication factor; and a step of generating spectral data by correcting a value detected by the detector, with the calculated correction factor.

REFERENCE SIGNS LIST

1 Flow cytometer
11 Laser beam source
12 Lens
13 Optofluidic system
14 Filter detector
15 User interface
16 Prism
17 Array-type high-sensitivity detector (PMT)
21 Fluorescence spectrum detection section
22 Information processing apparatus
23 Equipment control section
24 Data recording section
25 Data analysis section
31 Multiplication factor setting section
32 Correction factor calculation section
33 Spectrum generation section
34 Data adjustment section
35 Reference spectrum calculation section
36 Spectrum separation section
37 Detector evaluation section

The invention claimed is:

1. A spectrum-type fine particle measurement apparatus comprising:

a detection section having a plurality of detectors for detecting light from fine particles; and processing circuitry configured to:

gain for each of the plurality of detectors;

calculate a correction factor on a basis of the set gain; and generate spectral data by correcting a value detected by a detector of the plurality of detectors, with the calculated correction factor.

2. The fine particle measurement apparatus of claim 1, wherein the processing circuitry is further configured to individually adjust the gain for each of the plurality of detectors.

3. The fine particle measurement apparatus of claim 1, wherein the processing circuitry is further configured to automatically adjust a detected maximum value to a predetermined threshold on the basis of the set gain.

4. The fine particle measurement apparatus of claim 3, wherein the predetermined threshold is a detection upper limit value of the detector.

5. The fine particle measurement apparatus of claim 1, wherein the processing circuitry is further configured to calculate a reference spectrum on a basis of the generated spectral data.

6. The fine particle measurement apparatus of claim 5, wherein the processing circuitry is further configured to separate spectra by using the calculated reference spectrum.

7. The fine particle measurement apparatus of claim 6, wherein the processing circuitry is configured to perform a spectral separation process by using a weighted least squares method that assigns weights on a basis of the calculated correction factor.

8. The fine particle measurement apparatus of claim 1, wherein the processing circuitry is configured to set the gain on a basis of a voltage applied to the detector.

9. The fine particle measurement apparatus of claim 1, wherein the processing circuitry is configured to automatically set the gain from a single piece of measurement data of a sample including a mixture of single-stained samples stained with a single fluorescent dye or a multi-stained sample stained with a plurality of fluorescent dyes.

10. A spectrum-type fine particle measurement apparatus comprising:

a detection section having a plurality of detectors for detecting light from fine particles; and processing circuitry configured to:

set a gain for each of the plurality of detectors;

calculate a correction factor on a basis of the set gain; and generate spectral data by correcting a value detected by a detector of the plurality of detectors, with the calculated correction factor, wherein the correction factor is a value based on uniformity of the detector, a wavelength band width detected for each of the plurality of detectors, or wavelength dependence of photoelectric conversion.

11. A spectrum-type fine particle measurement apparatus comprising:

a detection section having a plurality of detectors for detecting light from fine particles; and processing circuitry configured to:

set a gain for each of the plurality of detectors;

calculate a correction factor on a basis of the set gain; and generate spectral data by correcting a value detected by a detector of the plurality of detectors, with the calculated correction factor, wherein the processing circuitry is configured to automatically calculate the correction factor from a single piece of measurement data of a sample including a mixture of single-stained samples stained with a single fluorescent dye or a multi-stained sample stained with a plurality of fluorescent dyes.

12. A spectrum-type fine particle measurement apparatus comprising:

a detection section having a plurality of detectors for detecting light from fine particles; and processing circuitry configured to:

set a gain for each of the plurality of detectors;

calculate a correction factor on a basis of the set gain;

generate spectral data by correcting a value detected by a detector of the plurality of detectors, with the calculated correction factor; and evaluate the detector by using measurement data of a mixture of a plurality of fine particles having different grain diameters and different fluorescence intensities.

13. An information processing apparatus comprising:

processing circuitry configured to:

gain for each of a plurality of detectors, the detectors detecting light from fine particles;

calculate a correction factor on a basis of the set gain; and generate spectral data by correcting a value detected by a detector of the plurality of detectors, with the calculated correction factor.

14. An information processing method executed by processing circuitry, the method comprising:

setting a gain for each of a plurality of detectors, the detectors detecting light from fine particles;

calculating a correction factor on a basis of the set gain; and generating spectral data by correcting a value detected by a detector of the plurality of detectors, with the calculated correction factor.

* * * * *